(12) United States Patent
Hinoki et al.

(10) Patent No.: US 7,251,122 B2
(45) Date of Patent: Jul. 31, 2007

(54) ELECTRIC CHEMICAL CAPACITOR, AND METHOD AND APPARATUS FOR MANUFACTURING ELECTRODE FOR ELECTRIC CHEMICAL CAPACITOR

(75) Inventors: Kiyonori Hinoki, Tokyo (JP); Yousuke Miyaki, Tokyo (JP); Kazuo Katai, Tokyo (JP); Hideki Tanaka, Tokyo (JP); Tsuyoshi Ichiki, Tokyo (JP)

(73) Assignee: TDK Corporation, Tokyo (JP)

( * ) Notice: Subject to any disclaimer, the term of this patent is extended or adjusted under 35 U.S.C. 154(b) by 202 days.

(21) Appl. No.: 11/016,827

(22) Filed: Dec. 21, 2004

(65) Prior Publication Data

US 2005/0201041 A1    Sep. 15, 2005

(30) Foreign Application Priority Data

Dec. 22, 2003    (JP) .............................. 2003-425020
Dec. 24, 2003    (JP) .............................. 2003-427269

(51) Int. Cl.
*H01G 9/00*    (2006.01)

(52) U.S. Cl. ..................... 361/502; 361/503; 361/504; 361/508; 361/512; 361/519

(58) Field of Classification Search ........ 361/502–504, 361/508–512, 516–519, 523–534; 29/25.01, 29/25.03
See application file for complete search history.

(56) References Cited

U.S. PATENT DOCUMENTS

| | | | | |
|---|---|---|---|---|
| 5,450,279 A | * | 9/1995 | Yoshida et al. | 361/502 |
| 5,579,203 A | * | 11/1996 | Klaschka | 361/519 |
| 6,201,686 B1 | * | 3/2001 | Hiratsuka et al. | 361/502 |
| 6,776,807 B2 | * | 8/2004 | Shida et al. | 29/623.5 |
| 6,884,270 B2 | * | 4/2005 | Yoshino et al. | 29/623.5 |
| 6,890,363 B1 | * | 5/2005 | Sakai et al. | 29/25.03 |

FOREIGN PATENT DOCUMENTS

| | | |
|---|---|---|
| JP | 3-92024 | 9/1991 |
| JP | 5-82396 | 4/1993 |
| JP | 11-162787 | 6/1999 |
| JP | 2000-353514 | 12/2000 |
| JP | 2001-250742 | 9/2001 |
| JP | 2001-266852 | 9/2001 |
| JP | 2001-284184 | 10/2001 |
| JP | 2002-313327 | 10/2002 |
| JP | 2003-297701 | 10/2003 |
| WO | WO 03/038846 A1 | 5/2003 |

* cited by examiner

*Primary Examiner*—Nguyen T. Ha
(74) *Attorney, Agent, or Firm*—Oblon, Spivak, McClelland, Maier & Neustadt, P.C.

(57) ABSTRACT

An electric chemical capacitor includes first and second electrodes each including a collector 111, 121, a polarized electrode layer 112, 122 and an undercoat layer 113, 123 for bonding the collector and the polarized electrode layer with each other, and a separator put between the first and second electrodes so that the polarized electrode layers 112 and 122 face each other, wherein an end portion of each undercoat layer 113, 123 is located in the same position as or on the outer side of an end portion of the corresponding polarized electrode layer 112, 122, and located on the inner side of an end portion of the separator 130. Thus, the polarized electrode layers can be prevented from peeling from the collector. Further, the undercoat layers can be prevented from abutting against each other, and the undercoat layer of one electrode and the collector of the other electrode can be prevented from abutting against each other.

7 Claims, 19 Drawing Sheets

ELECTRIC CHEMICAL CAPACITOR, AND METHOD AND APPARATUS FOR MANUFACTURING ELECTRODE FOR ELECTRIC CHEMICAL CAPACITOR

TECHNICAL FIELD

The present invention relates to an electric chemical capacitor, and particularly relates to an electric chemical capacitor having an electrode provided with an undercoat layer. In addition, the invention relates to a method and apparatus for manufacturing an electrode for an electric chemical capacitor, and particularly relates to a method and apparatus for manufacturing an electrode for an electric chemical capacitor, in which the position where a polarized electrode layer is formed can be controlled with high precision.

BACKGROUND ART

Electric chemical capacitors such as electric double layer capacitors and so on can be made smaller in size and lighter in weight easily. Therefore, electric chemical capacitors are expected, for example, as backup power supplies for portable equipment (miniature electronic equipment) or the like, auxiliary power supplies for electric vehicles or hybrid vehicles, etc. Thus, various examinations have been made to improve the performance of the electric chemical capacitors. A typical electric chemical capacitor has a laminated structure in which a separator is put between electrodes (electric chemical capacitor electrodes) each including a collector and a polarized electrode layer formed thereon. When high capacitance is required in an electric vehicle power supply, it is typical to use a structure in which a large number of such electrodes are laminated through separators (see Patent Documents 1 and 2).

[Patent Document 1] Japanese Patent Laid-Open No. 2001-250742

[Patent Document 2] Japanese Patent Laid-Open No. 2001-284184

The capacitance of an electric chemical capacitor depends largely on the area of a polarized electrode layer included in each electrode. In order to increase the capacitance of the electric chemical capacitor, it is therefore preferable to set the area of the polarized electrode layer to be as wide as possible.

However, a part of the collector may be used as an extractor electrode or the like. In this case, when the area of the polarized electrode layer is set to be too wide, an area available as the extractor electrode is so insufficient that it is difficult to assemble the electric chemical capacitor. Accordingly, in order to secure the capacitance as large as possible without spoiling the easiness to assemble, it is important to accurately control the position where the polarized electrode layer is formed on the collector.

On the other hand, in some electrodes for use in electric chemical capacitors, an undercoat layer serving as an adhesive layer may be provided between a collector and a polarized electrode layer so as to enhance the adhesion strength therebetween. A high-conductivity material is generally used for such an undercoat layer in order to prevent the resistance value from increasing. The undercoat layer is a layer for bonding the collector layer and the polarized electrode layer with each other. It is therefore necessary to set the region where the undercoat layer is provided to be equal to or wider than the region where the polarized electrode layer is provided.

DISCLOSURE OF THE INVENTION

However, when the region where the undercoat layer is provided is too wide as compared with the region where the polarized electrode layer is provided, the exposed portion of the undercoat layer becomes large so that undercoat layers of electrodes adjacent to each other may abut against each other or an undercoat layer of one electrode may abut against a collector layer of an adjacent electrode. Thus, there is a fear that a failure of short-circuit is caused. Such a problem becomes particularly important when a structure in which a large number of electrodes are laminated through separators is used. It is therefore necessary to more accurately control the position where a polarized electrode layer is formed when an undercoat layer is used.

It is therefore an object of the invention to provide an electric chemical capacitor in which short-circuit through an undercoat layer is prevented.

It is another object of the invention to provide a method and apparatus for manufacturing an electrode for an electric chemical capacitor, in which the position where a polarized electrode layer is formed can be controlled with high precision.

[Means for Solving the Problems]

An electric chemical capacitor according to the invention includes first and second electrodes each including a collector, a polarized electrode layer and an undercoat layer for bonding the collector and the polarized electrode layer with each other, and a separator put between the first and second electrodes so that the polarized electrode layers face each other, wherein an end portion of each undercoat layer is located in the same position as or on the outer side of an end portion of the corresponding polarized electrode layer, and located on the inner side of an end portion of the separator.

According to the invention, the end portion of the undercoat layer is located in the same position as or on the outer side of the end portion of the polarized electrode layer. Accordingly, the undercoat layer is always present between the polarized electrode layer and the collector. As a result, the probability that the polarized electrode layer will peel from the collector becomes very low. In addition, the end portion of the undercoat layer is located on the inner side of the end portion of the separator. Accordingly, the separator is always put between the undercoat layer included in the first electrode and the undercoat layer included in the second electrode. As a result, there is no fear that the undercoat layers abut against each other or the undercoat layer of one electrode abuts against the collector of the other electrode. Thus, peeling or short-circuit of the polarized electrode layer is effectively prevented from occurring. It is therefore possible to secure high reliability. The aforementioned conditions are preferably satisfied in all the end portions (full outer circumferences) of the first and second electrodes.

In addition, it is preferable that each collector includes an extractor electrode, and the end portion of the separator is located on the inner side of an end portion of each extractor electrode. With this configuration, there is no fear that the separator becomes an obstacle to connection between each extractor electrode and an external circuit. Also when a shim is put among a plurality of extractor electrodes having equal potential, there hardly occurs interfere between the shim and each undercoat layer. Thus, the shape of the electric chemical capacitor can be retained correctly.

In addition, it is preferable that a distance between an end portion of each undercoat layer and an end portion of the corresponding polarized electrode layer is not longer than 0.5 mm. The reason is as follows. That is, when the distance exceeds 0.5 mm, the area of the polarized electrode layer is reduced to be smaller than necessary. As a result, the capacitance is reduced.

According to another aspect of the invention, an electric chemical capacitor includes a plurality of separators, and a plurality of first and second electrodes disposed alternately through the separators, wherein each of the first and second electrodes includes a collector with an extractor electrode, polarized electrode layers provided on opposite sides of the collector, and undercoat layers for bonding the collector and the polarized electrode layers with each other respectively, while an end portion of each undercoat layer is located in the same position as or on the outer side of an end portion of the corresponding polarized electrode layer, and located on the inner side of end portions of the separators. According to the invention, peeling or short-circuit of the polarized electrode layer can be effectively prevented from occurring, while attaining a large capacitance.

In addition, it is preferable that the electric chemical capacitor further includes shims disposed among a plurality of extractor electrodes included in the first electrodes and among a plurality of extractor electrodes included in the second electrodes respectively. According to the invention, even when such shims are provided, there hardly occur interfere between each shim and each undercoat layer. As a result, the shape of the electric chemical capacitor as a whole can be retained correctly.

Further, a method for manufacturing an electrode for an electric chemical capacitor according to the invention includes the steps of: coating a belt-like collector conveyed in a length direction thereof with a polarized electrode layer having a predetermined width so as to leave an uncoated region in at least one of width-direction opposite end portions of the collector (coating step); and detecting a border position between a region coated with the polarized electrode layer and the uncoated region on the collector (detection step); wherein feedback control is performed on the coating step based on a detection result in the detection step so as to fit the border position to a predetermined position.

According to the invention, feedback control is performed on the coating step so as to fit the border position to the predetermined position. Accordingly, it is possible to accurately control the position where the polarized electrode layer is formed. Thus, even when a part of the collector is used as an extractor electrode, the capacitance can be secured to be as large as possible without spoiling the easiness to assemble.

In addition, it is preferable that in the coating step, the collector is coated with the polarized electrode layer so that uncoated regions are left in both the width-direction opposite end portions of the collector, and widths of the two uncoated regions are made substantially equal to each other by the feedback control. Thus, even when the laminate of the collector and the polarized electrode layer is punched so that the two uncoated regions can be used as the extractor electrodes, the widths of the extracted extractor electrodes in the electrode for the electric chemical capacitor can be substantially fixed.

Apparatus for manufacturing an electrode for an electric chemical capacitor according to the invention includes a conveyance unit for conveying a belt-like collector in a length direction thereof, an electrode coating unit for coating the collector with a polarized electrode layer having a predetermined width so as to leave an uncoated region in at least one of width-direction opposite end portions of the collector, a detection unit for detecting a border position between a region coated with the polarized electrode layer and the uncoated region on the collector, a drive unit for driving the electrode coating unit in the width direction of the collector, and a control unit for performing feedback control on the drive unit based on a detection result of the border position obtained by the detection unit. Also in the invention, feedback control is performed on the drive unit for driving the electrode coating unit so as to fit the border position to the predetermined position. Accordingly, it is possible to accurately control the position where the polarized electrode layer is formed.

In addition, it is preferable that the electrode coating unit coats the collector with the polarized electrode layer so that uncoated regions are left in the width-direction opposite end portions of the collector. With this configuration, the laminate of the collector and the polarized electrode layer can be punched so that both the uncoated regions can be used as extractor electrodes.

In addition, it is preferable that the apparatus for manufacturing an electrode for an electric chemical capacitor according to the invention further includes an undercoat coating unit provided on the upstream side of the electrode coating unit and for coating the collector with an undercoat layer having a predetermined width so as to leave an uncoated region in at least one of the width-direction opposite end portions of the collector. Further, it is preferable that the apparatus further includes another detection unit for detecting a border position between a region coated with the undercoat layer and the uncoated region uncoated with the undercoat layer on the collector, and another drive unit for driving the undercoat coating unit in the width direction of the collector, wherein the control unit performs feedback control on the another drive unit based on a detection result of the border position obtained by the another detection unit. In this case, it is preferable that the electrode coating unit applies the polarized electrode layer not onto the uncoated region uncoated with the undercoat layer but onto the region coated with the undercoat layer. With this configuration, the positional relationship between the polarized electrode layer and the undercoat layer can be also controlled with high precision. Accordingly, peeling in the polarized electrode layer or a failure of short-circuit through the undercoat layer is prevented from occurring.

[Effect of the Invention]

In such a manner, according to the invention, peeling or short-circuit of the polarized electrode layer is effectively prevented from occurring in the electric chemical capacitor. Thus, high reliability can be secured. In addition, according to the invention, feedback control is performed on the position where the polarized electrode layer is formed, based on the detected border position. Accordingly, the position where the polarized electrode layer is formed can be controlled with high precision. Thus, even when a part of the collector is used as an extractor electrode, the capacitance can be secured to be as large as possible without spoiling the easiness to assemble. In addition, when an undercoat layer is used, peeling in the polarized electrode layer or a failure of short-circuit through the undercoat layer is prevented from occurring.

BRIEF DESCRIPTION OF DRAWINGS

FIG. 13A being a schematic plan view of the laminate 520 cut off in a predetermined size; FIG. 13B being a schematically plan view of the laminate 520 from which the electric chemical capacitor electrode 510 has been cut out; FIG. 13C being a schematic plan view of the electric chemical capacitor electrode 510 cut out.

BEST MODE FOR CARRYING OUT THE INVENTION

First Embodiment

A preferred embodiment of the invention will be described below in detail with reference to the accompanying drawings.

Figure 1:
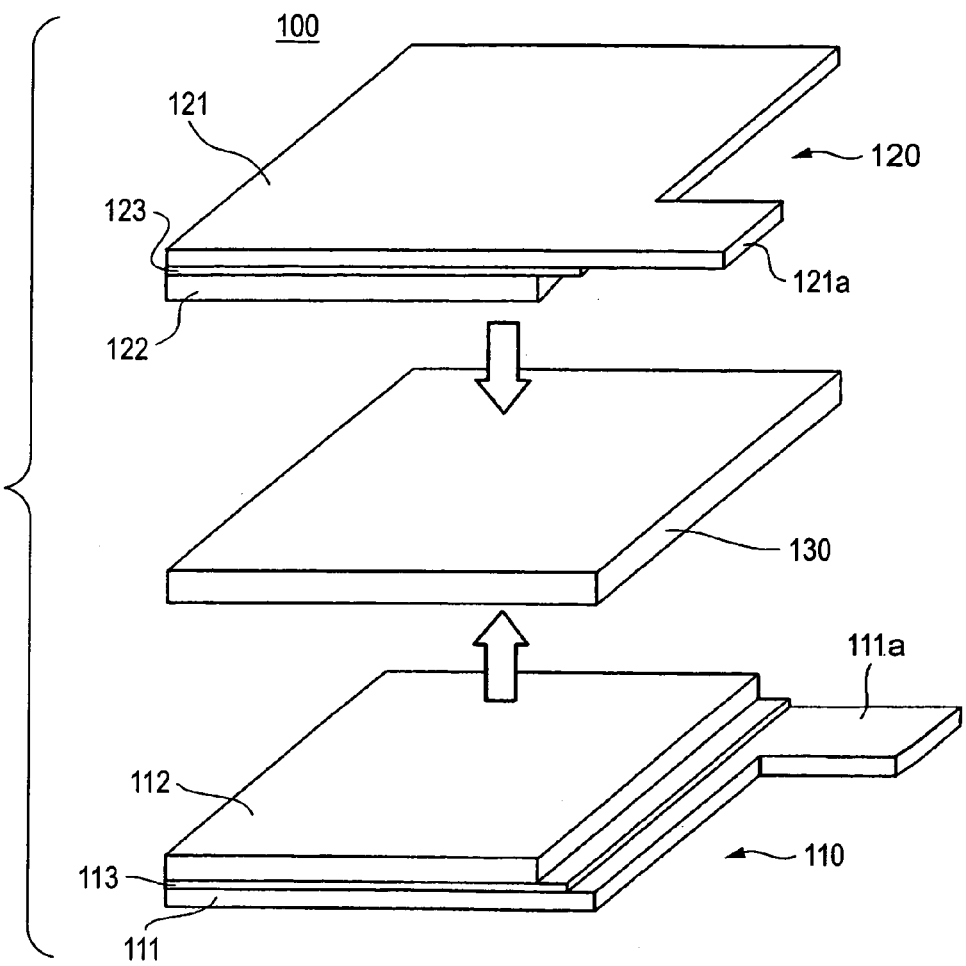
FIG. 1 is an exploded perspective view showing the state where an electric chemical capacitor 100 according to a preferred embodiment of the invention has not yet been assembled.

FIG. 1 is an exploded perspective view showing a state where an electric chemical capacitor 100 has not yet been assembled according to a preferred embodiment of the invention.

As shown in FIG. 1, the electric chemical capacitor 100 according to this embodiment includes a first electrode 110, a second electrode 120 and a separator 130 as its main components. The separator 130 is put between the first and second electrodes 110 and 120. The first electrode 110 is constituted by a collector 111, a polarized electrode layer 112 and an undercoat layer 113 provided therebetween. An extractor electrode 111a is provided in the collector 111. In the same manner, the second electrode 120 is constituted by a collector 121, a polarized electrode layer 122 and an undercoat layer 123 provided therebetween. An extractor electrode 121a is provided in the collector 121. As shown in FIG. 1, the separator 130 is put between the first electrode 110 and the second electrode 120 so that the polarized electrode layer 112 and the polarized electrode layer 122 are opposed to each other.

The separator 130 is put between the first and second electrodes 110 and 120, and then received in a not-shown casing. The casing is filled with an electrolyte solution. Thus, the electric chemical capacitor 100 according to this embodiment is completed. As a result, the electric chemical capacitor 100 functions as a capacitor having one terminal in the extractor electrode 111a and the other terminal in the extractor electrode 121a.

Materials of the collectors 111 and 121 are not limited especially if they are conductors good enough to transfer charges to the polarized electrode layers 112 and 122 sufficiently respectively. Known collector materials used in electric chemical capacitors, such as aluminum (Al), can be used. Thicknesses of the collectors 111 and 121 are not limited especially. In order to miniaturize the electric chemical capacitor, it is preferable to set the collectors 111 and 121 to be as thin as possible but thick enough to secure satisfactory mechanical strength. Specifically, when aluminum (Al) is used as the materials of the collectors 111 and 121, they are set to be preferably not thinner than 20 μm and not thicker than 50 μm, and more preferably not thinner than 20 μm and not thicker than 30 μm. When the thicknesses of the collectors 111 and 121 made of aluminum (Al) are set within this range, the electric chemical capacitor can be miniaturized while securing satisfactory mechanical strength.

The polarized electrode layers 112 and 122 are layers formed on the collectors 111 and 121 respectively. The polarized electrode layers 112 and 122 contribute to storage and discharge of charges. Each polarized electrode layer 112, 122 contains at least porous particles and a binder as its constituent materials. The porous particles have electronic conductivity, and the binder can bind the porous particles. The content of the porous particles and the content of the binder in the polarized electrode layer 112, 122 are not limited especially. It is, however, preferable that the content of the porous particles is made 84%-92% by mass with respect to the total mass of the polarized electrode layer 112, 122. It is preferable that the content of the binder is made 6.5%-16% by mass with respect to the total mass of the polarized electrode layer 112, 122. Particularly it is preferable that the polarized electrode layer 112, 122 is composed of 84%-92% by mass of the porous particles, 6.5%-16% by mass of the binder and 0%-1.5% by mass of conductive auxiliaries having electronic conductivity, with respect to the total mass of the polarized electrode layer 112, 122.

As for the porous particles contained in the polarized electrode layers 112 and 122, there is no special limit, except that they must have electronic conductivity good enough to contribute to storage and discharge of charges. For example, granular or fibrous activated carbons subjected to activation treatment can be used. As for the activated carbons, phenolic based activated carbons, coconut shell activated carbons, etc. can be used. The average particle size of the porous particles is preferably 3-20 μm, and the BET specific surface area obtained from nitrogen adsorption isotherms by use of a BET adsorption isotherm equation is preferably not lower than 1,500 $m^2/g$ or more preferably 2,000-2,500 $m^2/g$. When such porous particles are used, large capacitance per volume can be obtained.

The binder contained in the polarized electrode layers 112 and 122 is not limited especially, except that it must be able to bind the porous particles. For example, polytetrafluoroethylene (PTFE), polyvinylidene fluoride (PVDF), polyethylene (PE), polypropylene (PP), fluororubber, etc. can be used. Of these binders, fluororubber is especially preferred. This is because the porous particles can be bound satisfactorily by use of a small content of fluororubber so that the coating strength of the polarized electrode layers 112 and 122 can be enhanced, while the dimensions of the double layer interface can be increased so that the capacitance per volume can be enhanced.

Examples of the fluororubber include vinylidene fluoride-hexafluoropropylene based fluororubber (VDF-HFP based fluororubber), vinylidene fluoride-hexafluoropropylene-tetrafluoroethylene based fluororubber (VDF-HFP-TFE based fluororubber), vinylidene fluoride-pentafluoropropylene based fluororubber (VDF-PFP based fluororubber), vinylidene fluoride-pentafluoropropylene-tetrafluoroethylene based fluororubber (VDF-PFP-TFE based fluororubber), vinylidene fluoride-perfluoromethyl vinyl ether-tetrafluoroethylene based fluororubber (VDF-PFMVE-TFE based fluororubber), vinylidene fluoride-chlorotrifluoroethylene based fluororubber (VDF-CTFE based fluororubber), etc. Of them, fluororubbers obtained by copolymerization of at least two kinds selected from a group consisting of VDF, HFP and TFE is preferable. Particularly the VDF-HFP-TFE based fluororubber obtained by copolymerization of the three kinds of the group is preferred because there is a tendency to enhance adhesion and chemical resistance.

Further, the conductive auxiliaries contained in the polarized electrode layer 112, 122 in accordance with necessity are not limited especially, except that they must have electronic conductivity good enough to progress the transfer of charges between the collector 111, 121 and the polarized electrode layer 112, 122. For example, carbon black or the like can be used.

Examples of the carbon black include acetylene black, Ketjenblack, furnace black, etc. In the invention, acetylene black is preferably used. The average particle size of the carbon black is preferably 25-50 nm, and the BET specific surface area thereof is preferably not lower than 50 $m^2/g$ or more preferably 50-140 $m^2/g$.

In order to make the electric chemical capacitor 100 smaller in size and lighter in weight, the thickness of the polarized electrode layer 112, 122 is preferably 50-200 μm or more preferably 80-150 μm. Assume that this thickness means a maximum film thickness when the thickness of the polarized electrode layer 112, 122 is not uniform (for example, when the surface is embossed). When the thickness of the polarized electrode layer 112, 122 is set within the aforementioned range, the electric chemical capacitor can be made small in size and light in weight.

Each undercoat layer 113, 123 is provided between the corresponding collector 111, 121 and the corresponding polarized electrode layer 112, 122. The undercoat layer 113, 123 serves to give physical and electric adhesion to the collector 111, 121 and the polarized electrode layer 112, 122. It is preferable that a material with conductivity high enough to prevent the resistance value from increasing is used as the material of the undercoat layer 113, 123. For example, such a material can be composed of conductive particles and a binder which can bind the conductive particles. In this case, though not limited especially, the content of the conductive particles in the undercoat layer 113, 123 is preferably made 50%-70% by mass with respect to the total mass of the undercoat layer 113, 123, and the content of the binder is preferably made 30%-50% by mass with respect to the total mass of the undercoat layer 113, 123.

The conductive particles contained in the undercoat layer 113, 123 are not limited especially, except that they must have electronic conductivity good enough to progress the transfer of charges between the collector 111, 121 and the polarized electrode layer 112, 122. For example, particles made of carbon materials or the like having electronic conductivity can be used. Specific examples of the carbon materials include carbon black, graphite, etc.

Examples of the carbon black include acetylene black, Ketjenblack, furnace black, etc. Of them, acetylene black is preferably used. The average particle size of the carbon black is preferably 25-50 nm, and the BET specific surface area thereof is preferably not lower than 50 $m^2/g$ or more preferably 50-140 $m^2/g$.

Examples of the graphite include natural graphite, artificial graphite, expanded graphite, etc. Particularly artificial graphite is preferably used. The average particle size of the graphite is preferably 4-6 μm, and the BET specific surface area thereof is preferably not lower than 10 $m^2/g$ or more preferably 15-30 $m^2/g$. By use of such graphite, it is possible to give superior electronic conductivity to the undercoat layer 113, 123. Thus, there is a tendency to reduce the internal resistance satisfactorily.

On the other hand, the binder is not limited especially, except that it must be a material which can bind the conductive particles in the same manner as the binder contained in the polarized electrode layer 112, 122. For example, polytetrafluoroethylene (PTFE), polyvinylidene fluoride (PVDF), polyethylene (PE), polypropylene (PP), fluororubber, etc. can be used. Of these binders, fluororubber is especially preferred. This is because the conductive particles can be bound satisfactorily by use of a small content of fluororubber, while the physical and electric adhesion between the collector 111, 121 and the polarized electrode layer 112, 122 can be enhanced. The fluororubbers mentioned above as preferable binders to be contained in the polarized electrode layer 112, 122 can be used.

In order to make the total thickness of the electric chemical capacitor as thin as possible and prevent the resistance value of electrode 110, 120 from increasing, it is desired that the thickness of the undercoat layer 113, 123 is as thin as possible but thick enough to bond the collector 111, 121 and the polarized electrode layer 112, 122 satisfactorily. Specifically, it is desired that the undercoat layer 113, 123 is made not thinner than 0.2 μm and not thicker than 10 μm.

The separator 130 is a film for allowing the transfer of the electrolyte solution between the polarized electrode layers 112 and 122 while physically separating the polarized electrode layers 112 and 122 from each other. The separator 130 is preferably formed out of an insulative porous material. For example, it is possible to use a laminate of films made of polyethylene, polypropylene or polyolefin, an oriented film of a mixture of those resins, a fibrous non-woven fabric made of at least one kind of constituent material selected from a group consisting of cellulose, polyester and polypropylene, or the like. The thickness of the separator 130 is not limited especially. However, the separator 130 is made preferably not thinner than 15 μm and not thicker than 200 μm or more preferably not thinner than 30 μm and not thicker than 100 μm.

As the electrolyte solution, an electrolyte solution (aqueous electrolyte solution or electrolyte solution using an organic solvent) to be used in a known electric chemical capacitor such as an electric double layer capacitor can be used. However, when the electric chemical capacitor 100 is an electric double layer capacitor, any aqueous electrolyte solution limits the withstand voltage of the capacitor to a low voltage due to its low electrochemical decomposition voltage. It is therefore preferable to use an electrolyte solution using an organic solvent (nonaqueous electrolyte solution). The specific kind of electrolyte solution is not limited especially. It is, however, preferable to select the electrolyte solution in consideration of the solubility of a solute, the degree of dissociation of the solute, and the viscosity of the solution, and particularly it is preferable that the electrolyte solution is an electrolyte solution high in conductivity and high in potential window (high in decomposition start voltage). A typical example of the electrolyte solutions includes a solution having a quaternary ammonium salt such as tetraethylammonium tetrafluoroborate dissolved in an organic solvent such as propylene carbonate, diethylene carbonate, acetonitrile, etc. In this case, entrained moisture has to be managed severely.

The total thickness of the electric chemical capacitor 100 configured thus is preferably 70-250 μm or more preferably 100-180 μm. When the thickness is set thus, the electric chemical capacitor 100 can be made small in size and light in weight.

Figure 2:
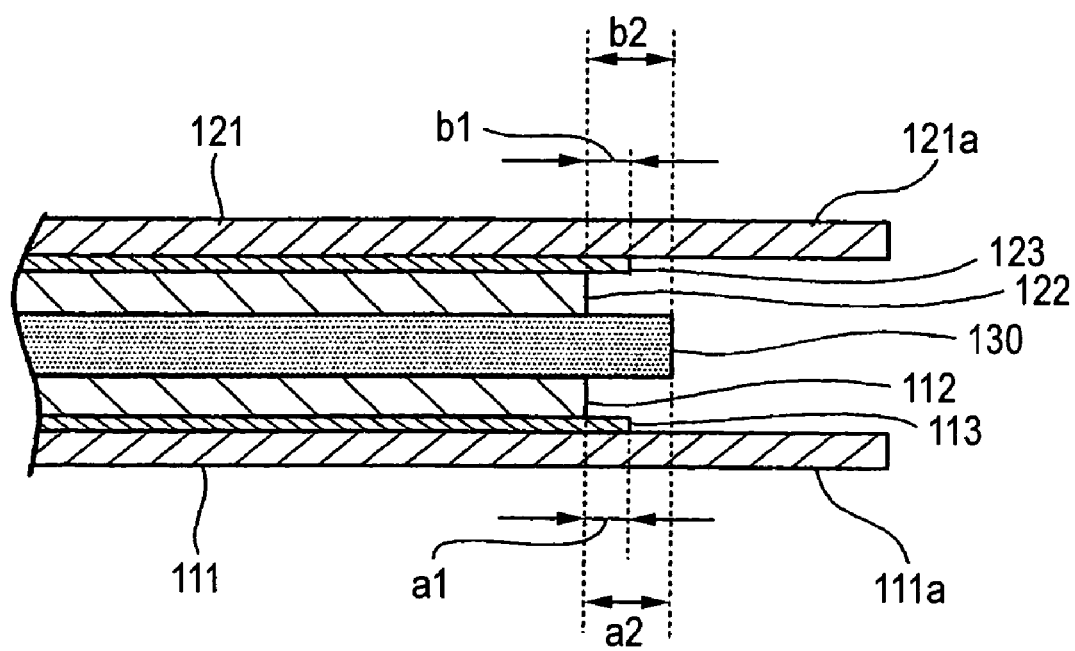
FIG. 2 is a partial sectional view showing an enlarged part of the electric chemical capacitor 100.

FIG. 2 is a partial sectional view showing an enlarged part of the electric chemical capacitor 100.

As shown in FIG. 2, in the electric chemical capacitor 100 according to this embodiment, the relation $0 \leq a1 < a2$ is established when "a1" designates the distance between an end portion of the polarized electrode layer 112 and an end portion of the undercoat layer 113, and "a2" designates the distance between the end portion of the polarized electrode layer 112 and an end portion of the separator 130. In the same manner, the relation $0 \leq b1 < b2$ is established when "b1" designates the distance between an end portion of the polarized electrode layer 122 and an end portion of the undercoat layer 123, and "b2" designates the distance between the end portion of the polarized electrode layer 122 and the end portion of the separator 130.

Here, the distance a1 has a positive value in the case (state shown in FIG. 2) where the end portion of the undercoat layer 113 is located on the outer side of the end portion of the polarized electrode layer 112. In the same manner, the distance b1 has a positive value in the case (state shown in FIG. 2) where the end portion of the undercoat layer 123 is located on the outer side of the end portion of the polarized electrode layer 122. On the other hand, the distance a2, b2 has a positive value in the case (state shown in FIG. 2) where the end portion of the separator 130 is located on the outer side of the end portion of the polarized electrode layer 112, 122.

Accordingly, the end portions of the undercoat layers 113 and 123 are located in the same positions as or on the outer side of the end portions of the corresponding polarized electrode layers 112 and 122 respectively, and located on the inner side of the end portion of the separator 130. As a result, the undercoat layers 113 and 123 are always present under the polarized electrode layers 112 and 122 respectively. Thus, there is no fear that peeling occurs in the polarized electrode layers 112 and 122. In addition, the separator 130 is always put between the undercoat layer 113 and the undercoat layer 123. Thus, there is no fear that the undercoat layers abut against each other or the undercoat layer of one electrode abuts against the collector of the other electrode.

In addition, as shown in FIG. 2, the end portion of the separator 130 is located on the inner side of the end portion of each extractor electrode 111a, 121a. Accordingly, there is no fear that the separator 130 becomes an obstacle to the connection between the extractor electrode 111a, 121a and an external circuit.

FIG. 2 shows an enlarged view of portions of the electric chemical capacitor 100 where the extractor electrodes 111a and 121a are provided. The other portions are just as shown in FIG. 1. That is, the end portions of the collector 111 (121), the polarized electrode layer 112 (122) and the undercoat layer 113 (123) are substantially aligned with the corresponding portions. That is, the relation a1=b1 is established. However, with respect to the separator 130, the relation a1<a2 and the relation b1<b2 are satisfied so that short-circuit is prevented from occurring.

Here, with reference to the drawings, description will be made about a problem when the relation $0 \leq a1$ (or $0 \leq b1$) is not satisfied and a problem when the relation a1<a2 (or b1<b2) is not satisfied.

Figure 3:
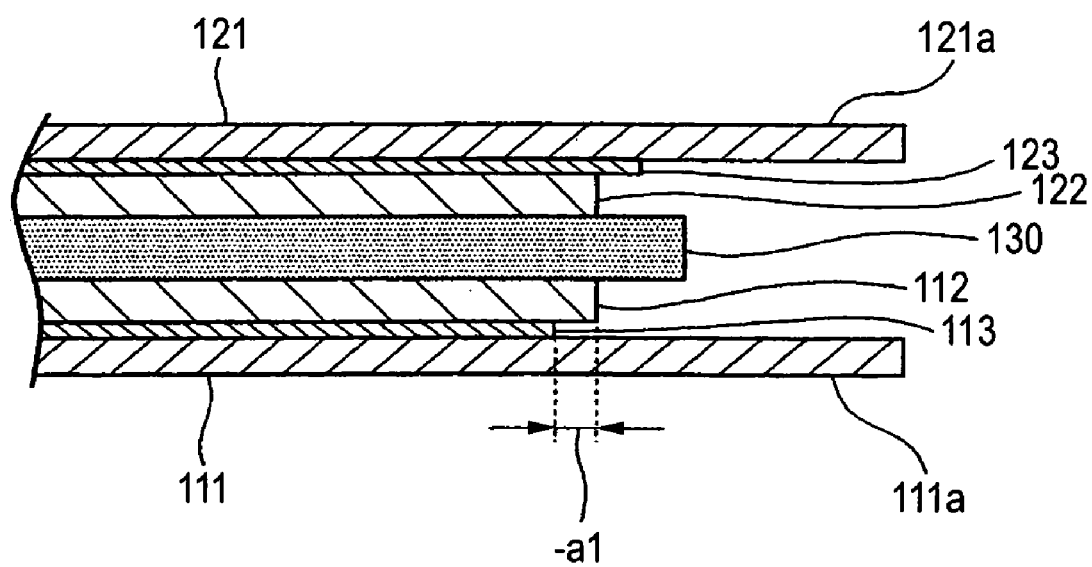
FIG. 3 is a partial sectional view when the relation $0 \leq a1$ is not satisfied but the relation $0 > a1$ is established.

FIG. 3 is a partial sectional view where the relation $0 \leq a1$ is not satisfied but the relation 0>a1 is established (that is, the end portion of the undercoat layer 113 is located on the inner side of the end portion of the polarized electrode layer 112). When the relation $0 \leq a1$ is not satisfied, the end portion of the polarized electrode layer 112 is loose from the collector 111 as shown in FIG. 3. Therefore, there is a fear that peeling from the collector 111 occurs in the end portion of the polarized electrode layer 112. Thus, the reliability of the product is lost. Though not shown, the same problem can be also caused in the case where the relation $0 \leq b1$ is not satisfied but the relation 0>b1 is established.

Figure 4:
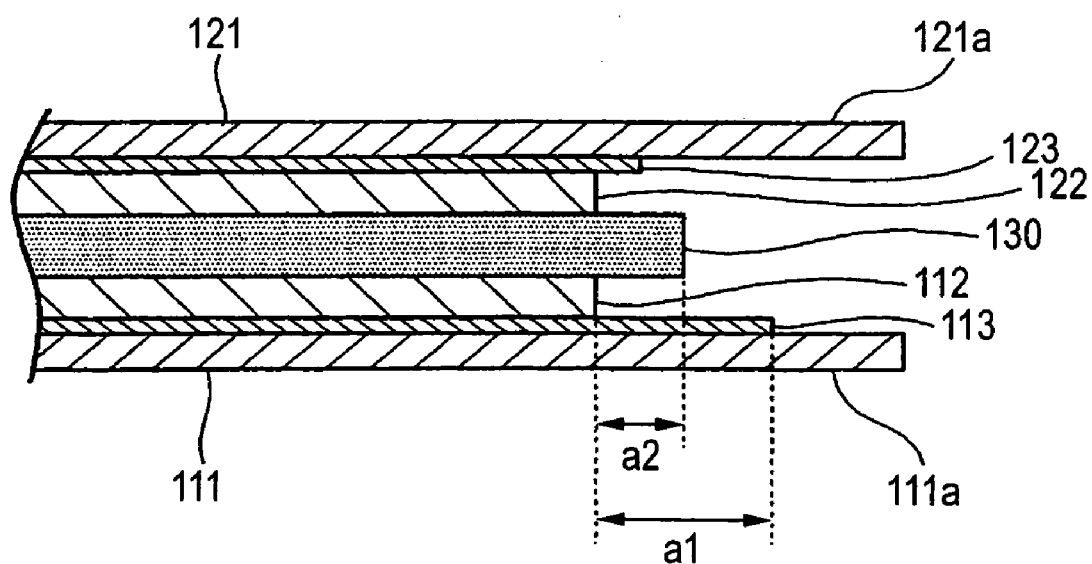
FIG. 4 is a partial sectional view when the relation $a1 < a2$ is not satisfied but the relation $a1 \geq a2$ is established.

On the other hand, FIG. 4 is a partial sectional view where the relation a1<a2 is not satisfied but the relation $a1 \geq a2$ is established (that is, the end portion of the separator 130 is located on the inner side of the end portion of the undercoat layer 113). When the relation a1<a2 is not satisfied, the end portion of the undercoat layer 113 is opposite to the collector 121 directly without putting the separator 130 therebetween, as shown in FIG. 4. Accordingly, the undercoat layer 113 may touch the collector 121, causing short-circuit. Thus, the reliability of the product is lost. Though not shown, the same problem can be also caused in the case where the relation b1<b2 is not satisfied but the relation $b1 \geq b2$ is established. In addition thereto, when either of the relations a1<a2 and b1<b2 is not satisfied but the relations $a1 \geq a2$ and $b1 \geq b2$ are established, the undercoat layer 113 and the undercoat layer 123 may touch each other, causing short-circuit. Since the undercoat layers 113 and 123 have predetermined thicknesses, the contact between the undercoat layers occurs more easily than the contact between the undercoat layer and the collector. That is, when the relations $a1 \geq a2$ and $b1 \geq b2$ are established, the reliability of the product is especially lowered.

Though not shown, when the end portion of the separator 130 is located on the inner side of the end portions of the polarized electrode layers 112 and 122, there is a fear that short-circuit occurs between the polarized electrode layer 112 and the polarized electrode layer 122. Not to say, it is therefore necessary to set the end portion of the separator 130 on the outer side of the end portions of the polarized electrode layers 112 and 122.

In contrast, in the electric chemical capacitor 100 according to this embodiment, as shown in FIG. 2, the relations $0 \leq a1 < a2$ and $0 \leq b1 < b2$ are established. Accordingly, there is no fear that the problems explained with reference to FIGS. 3 and 4 occur. Thus, it is possible to secure high reliability. The specific value of each distances a1, b1 is not limited especially. It is, however, preferable that the value is within a range of from 0 mm to 0.5 mm. When the value exceeds 0.5 mm, the area of the polarized electrode layer 112, 122 is made lower than necessary. As a result, the capacitance is reduced. On the other hand, in consideration of the application accuracy, it is just possible to set the distances a1 and b1 to be not longer than 0.5 mm. Thus, high capacitance can be secured.

Next, description will be made about a method for manufacturing the electric chemical capacitor 100.

A coating solution serving as the material of the undercoat layer 113, 123 and a coating solution serving as the material of the polarized electrode layer 112, 122 are prepared.

As for the coating solution serving as the material of the undercoat layer 113, 123, the aforementioned conductive particles and binder and liquid which will be described later are put into a mixer and stirred. In the same manner, as for the coating solution serving as the material of the polarized electrode layer 112, 122, the aforementioned porous particles and binder and liquid which will be described later, and the aforementioned conductive auxiliaries if necessary, are put into a mixer and stirred. It is preferable that the preparation of each coating solution includes a kneading operation and/or a dilution mixing operation. Here, the "kneading" means kneading materials by stirring a liquid with comparatively high viscosity. The "dilution mixing" means adding a solvent or the like to the kneaded liquid and mixing the liquid with comparatively low viscosity. The periods and temperatures of these operations are not limited especially. In order to make the dispersion uniform, it is preferable that the kneading time is made about 30 minutes to 2 hours and the kneading temperature is made about 40° C. to 80° C., while it is preferable that the dilution mixing time is made about 1 to 5 hours and the dilution mixing temperature is made about 20° C. to 50° C. Thus, the coating solution serving as the material of the undercoat layer 113, 123 and the coating solution serving as the material of the polarized electrode layer 112, 122 can be prepared.

The aforementioned liquid is not limited especially, except that the liquid must be able to dissolve or disperse the binder. For example, a ketone-based solvent such as methyl ethyl ketone (MEK) or methyl isobutyl ketone (MIBK) can be used.

The content of the liquid in the coating solution serving as the material of the undercoat layer 113, 123 is preferably made 600-2,000 parts by mass with respect to 100 parts by mass of the total solid content of the coating solution. The content of the liquid in the coating solution serving as the material of the polarized electrode layer 112, 122 is preferably made 200-400 parts by mass with respect to 100 parts by mass of the total solid content of the coating solution.

It is preferable that the content of the conductive particles and the content of the binder in the coating solution serving as the material of the undercoat layer 113, 123 are set so that the content of the conductive particles and the content of the binder after the undercoat layer 113, 123 is formed are within the aforementioned ranges respectively. In the same manner, it is preferable that the content of the conductive particles and the content of the binder in the coating solution serving as the material of the polarized electrode layer 112, 122 are set so that the content of the conductive particles and the content of the binder after the polarized electrode layer 112, 122 is formed are within the aforementioned ranges respectively.

Figure 5:
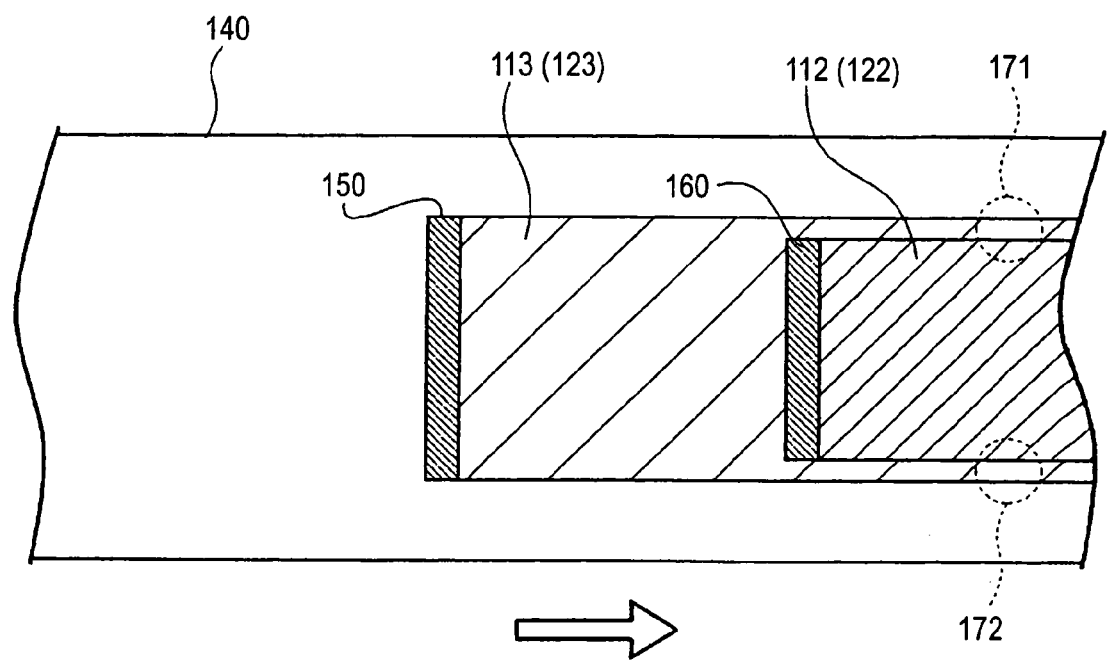
FIG. 5 is a view for explaining a method for forming an undercoat layer 113, 123 and a polarized electrode layer 112, 122 on a surface of a collector sheet 140.

The two coating solutions are prepared thus. After that, as shown in FIG. 5, the coating solution for the undercoat layer and the coating solution for the polarized electrode layer are supplied from gravure cylinders 150 and 160 respectively while the collector sheet 140 is conveyed in one direction (from the left to the right in FIG. 5). In this event, as shown in FIG. 5, the gravure cylinder 160 is placed on the downstream side of the gravure cylinder 150. Accordingly, the undercoat layer 113, 123 is first formed on the surface of the collector sheet 140, and the polarized electrode layer 112, 122 is formed on top of the undercoat layer 113, 123. As for the coating method, various known coating methods can be used without particular limit. For example, methods such as an extrusion lamination method, a doctor blade method, a gravure coating method, a reverse coating method, an applicator coating method, a screen printing method, etc. can be used.

It is necessary to establish the relation $W4 \geq W2$ between the width W4 of the gravure cylinder 150 for forming the undercoat layer 113, 123 and the width W2 of the gravure cylinder 160 for forming the polarized electrode layer 112, 122. In addition, in consideration of the accuracy of alignment in coating position, it is preferable to establish the relation $W4 > W2$. When $W4 < W2$, the polarized electrode layer 112, 122 will protrude from the undercoat layer 113, 123 in one end portion 171 or the other end portion 172 of the laminate. When $W4 = W2$, slight misalignment in coating position will allow the polarized electrode layer 112, 122 to protrude in either end portion 171 or 172.

It is, however, preferable that the relation $W4 - W2 \leq 1.0$ mm is established in the difference between the width W4 of the gravure cylinder 150 and the width W2 of the gravure cylinder 160. It is more preferable that the relation $W4 - W2 \leq 0.5$ mm is established. When the relation $W4 - W2 \leq 1.0$ mm is established, the exposed width (corresponding to the distance a1 or b1) of the undercoat layer 113, 123 can be made not longer than 0.5 mm in at least one of the end portions 171 and 172. Particularly when the relation $W4 - W2 \leq 0.5$ mm is established, the exposed width of the undercoat layer 113, 123 can be made not longer than 0.5 mm in both the end portions 171 and 172.

However, when the difference between the width W4 of the gravure cylinder 150 and the width W2 of the gravure cylinder 160 is too small, there is a high possibility that the polarized electrode layer 112, 122 protrudes due to misalignment in coating position. In consideration of the coating accuracy, it is therefore particularly preferable to establish the relation:

$$0.2 \text{ mm} \leq W4 - W2 \leq 0.5 \text{ mm}$$

Figure 6:
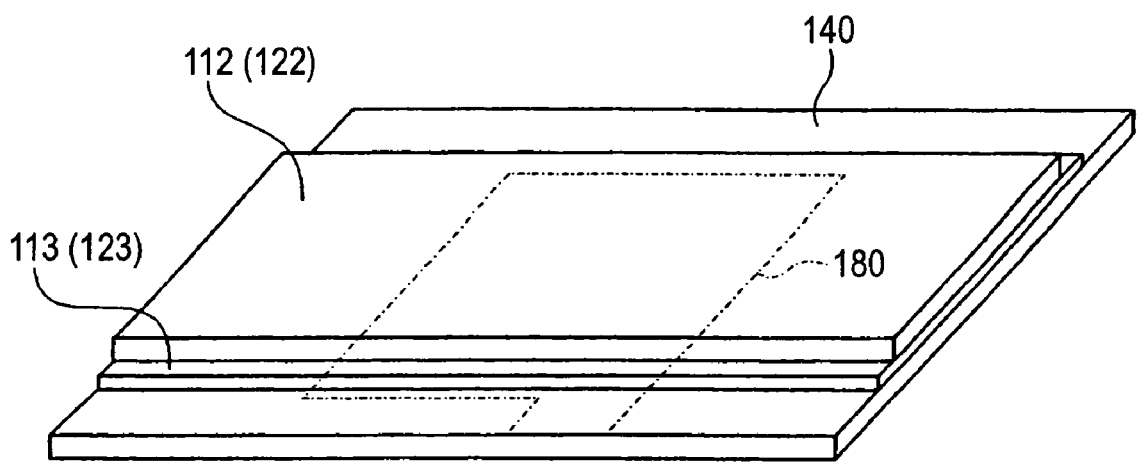
FIG. 6 is a view for explaining a method for extracting an electrode from the collector sheet 140.

In such a manner, the undercoat layer 113, 123 and the polarized electrode layer 112, 122 are formed on the surface of the collector sheet 140 so as to be put on top of each other. After that, the sheet is cut along a chain line 180 shown in FIG. 6. Thus, the first electrode 110 or the second electrode 120 shown in FIG. 1 is completed. Then, as described previously, the separator 130 is put between the first and second electrodes 110 and 120, and received in a not-shown casing. The casing is filled with an electrolyte solution. Thus, the electric chemical capacitor 100 with one terminal in the extractor electrode 111a and the other terminal in the extractor electrode 121a is completed.

The polarized electrode layers 112 and 122 may be compressed by a roll press or the like to be increased in density before the collector sheet 140 with the undercoat layers 113 and 123 and the polarized electrode layers 112 and 122 formed thereon is cut off. Thus, the electric chemical capacitor 100 can be made thinner without lowering its capacitance.

Although description has been made above about the electric chemical capacitor 100 having only one pair of polarized electrode layers, an electric chemical capacitor to which the invention can be applied is not limited to the electric chemical capacitor 100. The effect of the invention becomes more conspicuous when it is applied to a structure in which a large number of polarized electrode layers are laminated.

Figure 7:
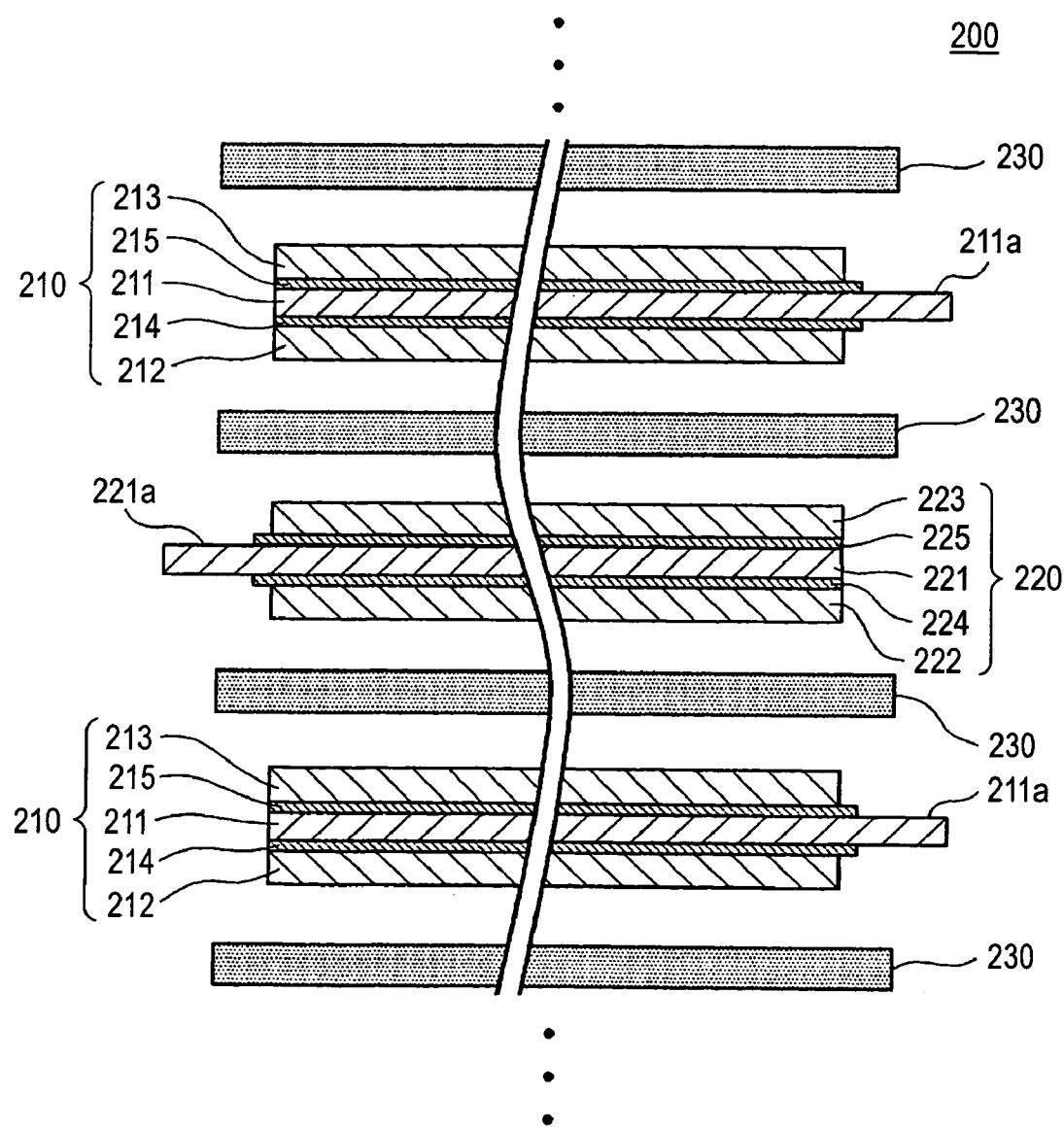
FIG. 7 is an exploded sectional view of an electric chemical capacitor 200 according to another preferred embodiment of the invention.

FIG. 7 is an exploded sectional view of an electric chemical capacitor 200 according to another preferred embodiment of the invention.

As shown in FIG. 7, the electric chemical capacitor 200 according to this embodiment is constituted by a plurality of first and second electrodes 210 and 220 disposed alternately, and a plurality of separators 230 each disposed between adjacent ones of the electrodes. Accordingly, the second electrodes 220 are cathodes when the first electrodes 210 are anodes, and the second electrodes 220 are anodes when the first electrodes 210 are cathodes. Each of the first and second electrodes 210 and 220 is constituted by a collector 211, 221, a polarized electrode layer 212, 222 provided in one side of the collector, a polarized electrode layer 213, 223 provided on the other side of the collector, an undercoat layer 214, 224 for bonding the collector 211, 221 and the polarized electrode layer 212, 222 with each other, and an undercoat layer 215, 225 for bonding the collector 211, 221 and the polarized electrode layer 213, 223 with each other. Each collector 211, 221 is provided with an extractor electrode 211a, 221a. A plurality of extractor electrodes 211a are disposed to face in one and the same direction, while a plurality of extractor electrodes 221a are disposed to face in one and the same direction different from the aforementioned direction.

Figure 8:
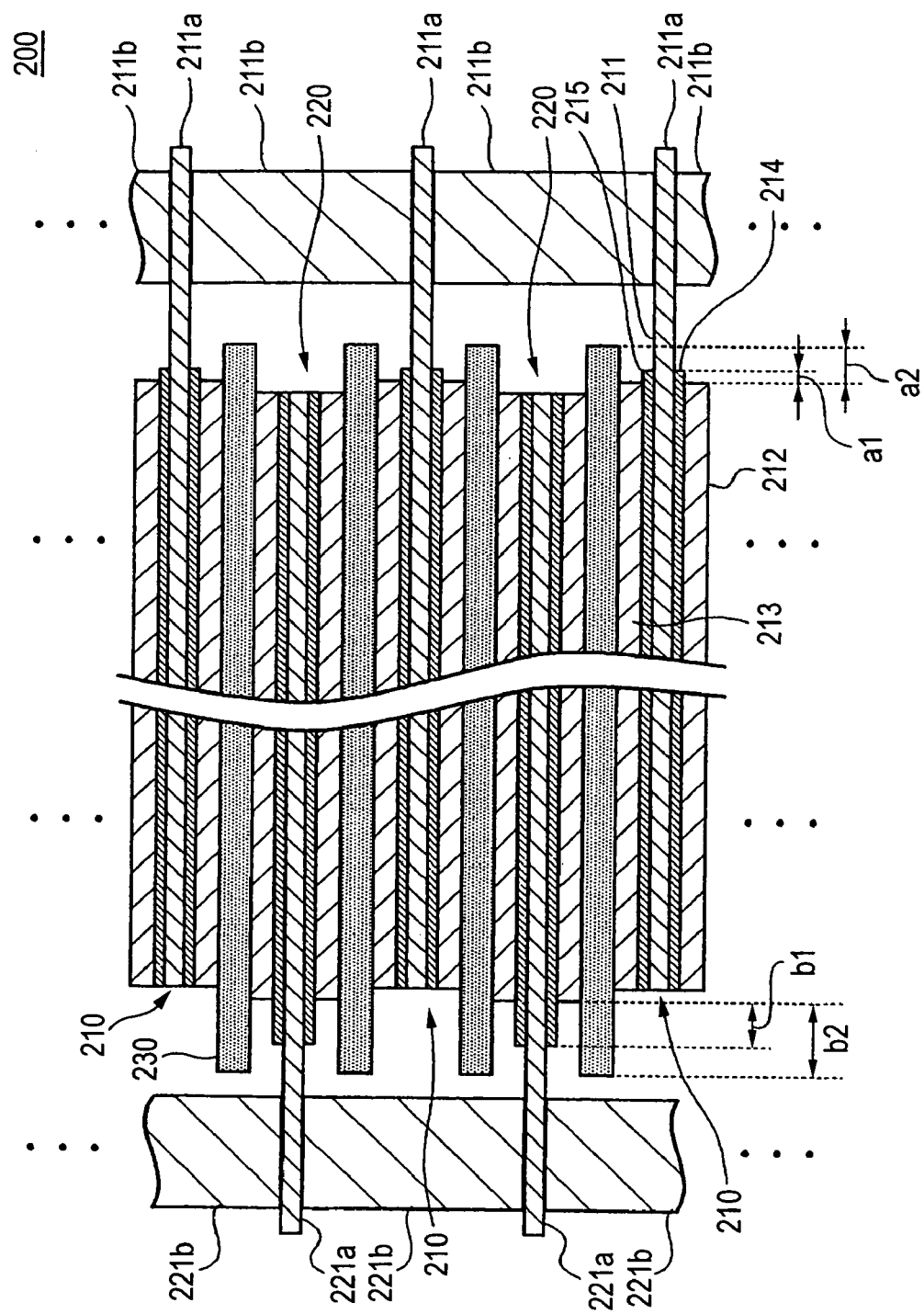
FIG. 8 is a partial sectional view of the electric chemical capacitor 200 which is in a laminated state.

The electric chemical capacitor 200 configured thus is completed as follows. That is, the separators 230 are put between adjacent ones of the electrodes respectively, and then received in a not-shown casing. The casing is filled with an electrolyte solution. Thus, the completed electric chemical capacitor 200 serves as a capacitor. In this case, as shown in FIG. 8, a shim 211b is inserted among the plurality of extractor electrodes 211a so as to electrically connect the extractor electrodes 211a to one another and mechanically retain the extractor electrodes 211a. In the same manner, a shim 221b is inserted among the plurality of extractor electrodes 221a so as to electrically connect the extractor electrodes 221a to one another and mechanically retain the extractor electrodes 221a. Each shim 211b, 221b serves to secure electric continuity (connection) among the extractor electrodes and to adjust their heights. Any material that is conductive in electricity and precise in thickness may be used for the shim 211b, 221b. Aluminum, stainless steel, etc. are preferred.

Also in the electric chemical capacitor 200 according to this embodiment, as shown in FIG. 8, the relation $0 \leq a1 < a2$ is established when "a1" designates the distance between an end portion of the polarized electrode layer 212 (or 213) and an end portion of the undercoat layer 214 (or 215), and "a2" designates the distance between the end portion of the polarized electrode layer 212 (or 213) and an end portion of the separator 230. In the same manner, the relation $0 \leq b1 < b2$ is established when "b1" designates the distance between an end portion of the polarized electrode layer 222 (or 223) and an end portion of the undercoat layer 224 (or 225), and "b2" designates the distance between the end portion of the polarized electrode layer 222 (or 223) and the end portion of the separator 230.

Accordingly, the end portions of the undercoat layers 214, 215, 224 and 225 are located in the same positions as or on the outer side of the end portions of the corresponding polarized electrode layers 212, 213, 222 and 223 respectively, and located on the inner side of the end portion of the separator 230. As a result, though the number of sites where short-circuit may occur increases due to the laminated structure, the occurrence of short-circuit can be prevented effectively in the same manner as in the aforementioned embodiment.

Figure 9:
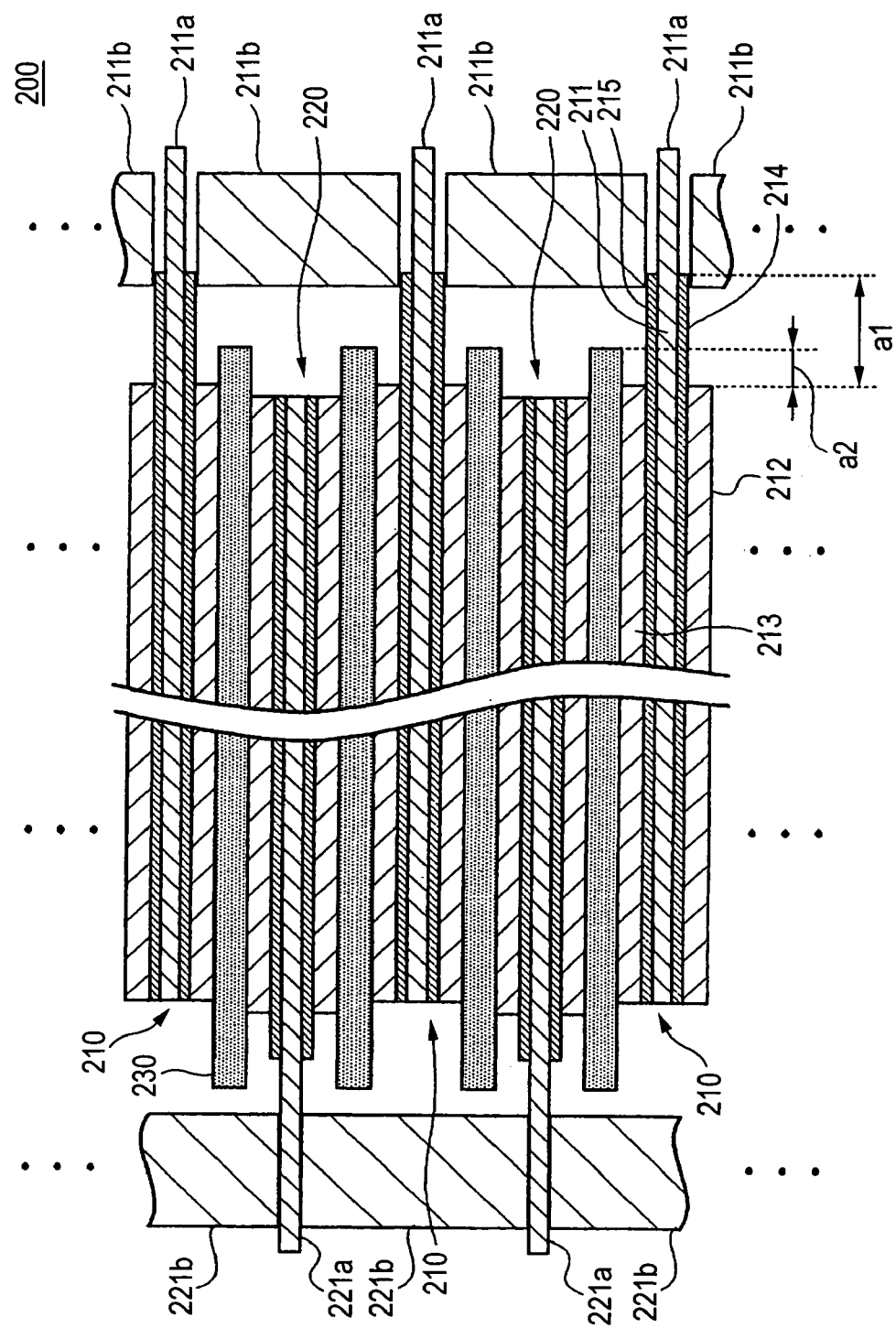
FIG. 9 is a view showing a state where undercoat layers 214 and 215 interfere with a shim 211b due to the relation $a1 > a2$.

In addition, when the values of the distances a1 and b1 are set within a range of from 0 mm to 0.5 mm, there is no fear that interference occurs between the undercoat layer 214, 215 and the shim 211b or between the undercoat layer 224, 225 and the shim 221b. Accordingly, for example, even when several hundreds of layers of electrodes are laminated through the separators 230, a desired shape can be retained. On the contrary, for example, when the relation a1>a2 is established, interference may occur between the undercoat layer 214, 215 and the shim 211b as shown in FIG. 9. In this case, when several hundreds of layers of electrodes are laminated, the thickness of the undercoat layers 214 and 215 leads to increase in total thickness in this region so that the desired shape cannot be retained.

In such a manner, the invention can obtain more conspicuous effect when a laminated structure of a large number of polarized electrode layers is used.

Although the invention has been described in details and with reference to its specific embodiments, it is obvious to those skilled in the art that various changes or modifications can be applied to the invention without departing from its spirit and scope.

For example, not only is it possible to use electric chemical capacitor electrodes according to the invention as electric double layer capacitor electrodes, but it is also possible to use them as electrodes for various electric chemical capacitors such as pseudo-capacitors, redox capacitors, etc.

Second Embodiment

A preferred embodiment of the invention will be described below in detail with reference to the accompanying drawings.

Figure 10:
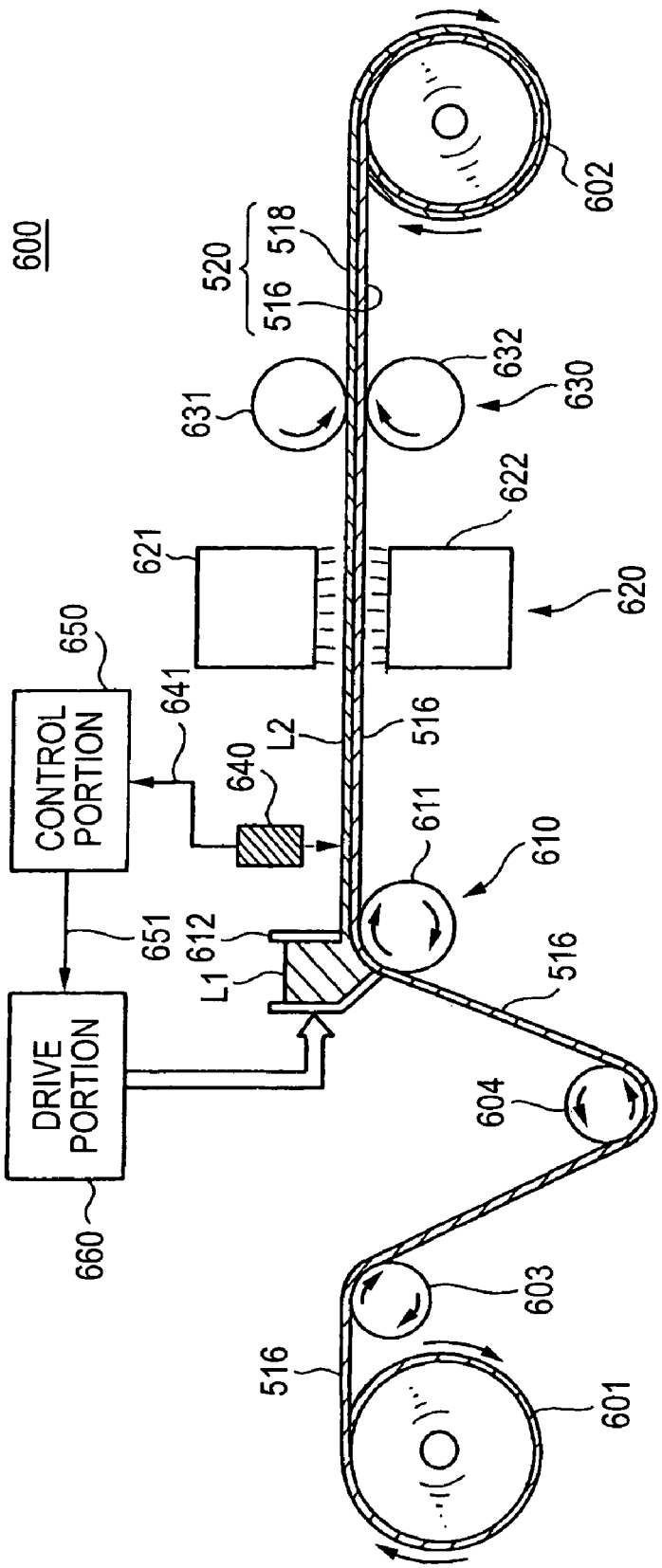
FIG. 10 is a schematic view showing a structure of apparatus 600 for manufacturing an electrode for an electric chemical capacitor according to a preferred embodiment of the invention.

FIG. 10 is a schematic view showing a structure of electric chemical capacitor electrode manufacturing apparatus according to a preferred embodiment of the invention.

As shown in FIG. 10, electric chemical capacitor electrode manufacturing apparatus 600 according to the embodiment has a supply roll 601 on which a belt-like collector 516 is wound, a take-up roll 602 rotatable in a predetermined velocity to thereby take up a laminate 520 of a collector 516 and a polarized electrode layer 518, an coater portion 610, a drier portion 620 and a roll press portion 630. The coater portion 610, the drier portion 620 and the roll press portion 630 are provided between the supply roll 601 and the take-up roll 602 in that order. In such a manner, the electric chemical capacitor electrode manufacturing apparatus 600 according to this embodiment has a configuration in which the coater portion 610, the drier portion 620 and the roll press portion 630 are disposed sequentially from the upstream (supply roll 601) side to the downstream (take-up roll 602) side. In addition, an optical sensor (detection unit) 640 such as a CCD sensor is provided between the coater portion 610 and the drier portion 620. An output signal 641 of the optical sensor 640 is supplied to a control portion (control unit) 650. Further, a drive portion (drive unit) 660 for adjusting the width-direction position of a coating film L2 formed by the coater portion 610 is provided in the electric chemical capacitor electrode manufacturing apparatus 600. The operation of the drive portion 660 is controlled by the output signal 651 of the control portion 650. As will be described later, the "coating film L2" is an undried film as an origin of the polarized electrode layer 518, which film may be referred to as "polarized electrode layer" simply without distinguishing an undried coating film from a dried coating film (polarized electrode layer) in this specification and its claims.

Detailed description will be made below about each constituent parts of the electric chemical capacitor electrode manufacturing apparatus 600.

The coater portion 610 is a portion for applying a coating solution L1 as the material of the polarized electrode layer 518 onto a surface of the collector 516. That is, the coater portion 610 is a portion for performing a "coating process". The coater portion 610 has a backup roll 611, and a knife coater (electrode coating unit) 612 for applying the coating solution L1 onto a surface of the collector 516 curved by the backup roll 611. As shown in FIG. 10, the collector 516 supplied from the supply roll 601 is conveyed to the coater portion 610 through a guide roll 603 and a tension roll 604. Thus, a coating film L2 as an origin of the polarized electrode layer 518 is formed on one surface of the collector 516. In this embodiment, the supply roll 601, the take-up roll 602, the guide roll 603 and the tension roll 604 constitutes a "conveyance unit" for conveying the collector 516.

Here, the material of the collector 516 is not limited especially, except that it must be a conductor good enough to transfer charges to the polarized electrode layer 518. Collector materials to be used for known electric chemical capacitor electrodes, such as aluminum (Al), can be used. The thickness of the collector 516 is not limited especially, either. In order to make the electric chemical capacitor smaller in size, it is preferable to make the collector 516 as thin as possible but thick enough to secure sufficient mechanical strength. Specifically, when aluminum (Al) is used as the material of the collector 516, the collector 516 is made preferably not thinner than 20 µm and not thicker than 50 µm or more preferably not thinner than 20 µm and not thicker than 30 µm. When the thickness of the collector 516 made of aluminum (Al) is set within this range, the electric chemical capacitor can be miniaturized while securing its sufficient mechanical strength.

Figure 11:
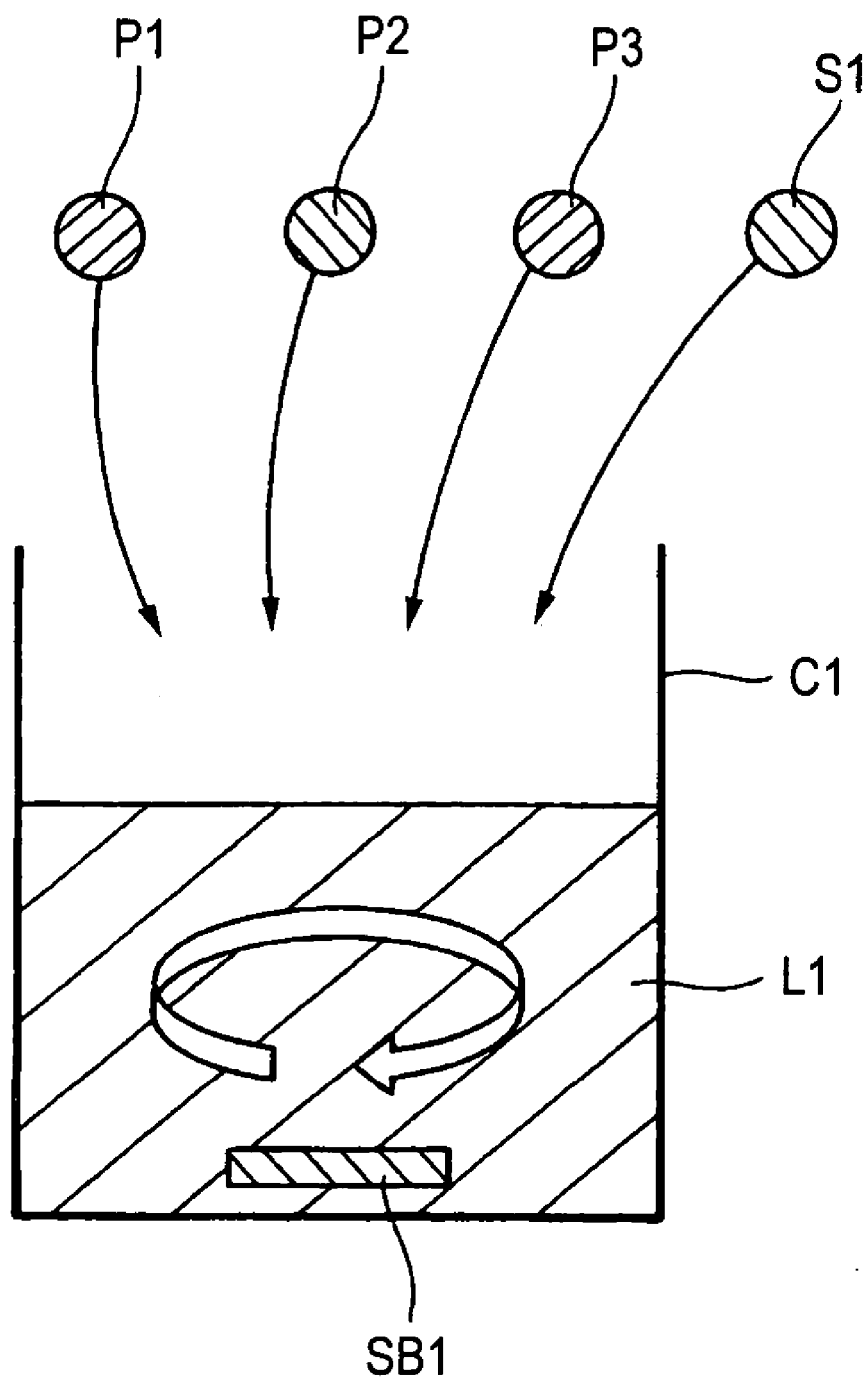
FIG. 11 is a schematic view for explaining a method for preparing a coating solution L1.

The coating solution L1 is a solution serving as the material of the polarized electrode layer 518. The coating solution L1 can be prepared in the following method. First, as shown in FIG. 11, porous particles P1, a binder P2 and liquid S1, and conductive auxiliaries P3 if necessary, are put into a mixer C1 having a stirring portion SB1, and stirred.

As for the porous particles P1, there is no special limit, except that they must be porous particles having electronic conductivity good enough to contribute to storage and discharge of charges. For example, granular or fibrous activated carbons subjected to activation treatment can be used. As for the activated carbons, phenolic based activated carbons, coconut shell activated carbons, etc. can be used. The average particle size of the porous particles is preferably 3-20 µm, and the BET specific surface area obtained from nitrogen adsorption isotherms by use of a BET adsorption isotherm equation is preferably not lower than 1,500 $m^2$/g or more preferably 2,000-2,500 $m^2$/g. When such porous particles are used, large capacitance per volume can be obtained.

The binder P2 is not limited especially, except that it must be able to bind the porous particles P1. For example, polytetrafluoroethylene (PTFE), polyvinylidene fluoride (PVDF), polyethylene (PE), polypropylene (PP), fluororubber, etc. can be used. Of these binders, fluororubber is especially preferred. This is because the porous particles P1 can be bound satisfactorily by use of a small content of fluororubber so that the coating strength of the polarized electrode layer 1018 can be enhanced, while the dimensions of the double layer interface can be increased so that the capacitance per volume can be enhanced.

Examples of the fluororubber include vinylidene fluoride-hexafluoropropylene based fluororubber (VDF-HFP based fluororubber), vinylidene fluoride-hexafluoropropylene-tetrafluoroethylene based fluororubber (VDF-HFP-TFE based fluororubber), vinylidene fluoride-pentafluoropropylene based fluororubber (VDF-PFP based fluororubber), vinylidene fluoride-pentafluoropropylene-tetrafluoroethylene based fluororubber (VDF-PFP-TFE based fluororubber), vinylidene fluoride-perfluoromethyl vinyl ether-tetrafluoroethylene based fluororubber (VDF-PFMVE-TFE based fluororubber), vinylidene fluoride-chlorotrifluoroethylene based fluororubber (VDF-CTFE based fluororubber), etc. Of them, fluororubbers obtained by copolymerization of at least two kinds selected from a group consisting of VDF, HFP and TFE is preferable. Particularly the VDF-HFP-TFE based fluororubber obtained by copolymerization of the three kinds of the group is preferred because there is a tendency to enhance adhesion and chemical resistance.

Further, the conductive auxiliaries P3 are not limited especially, except that they must have electronic conductivity good enough to progress the transfer of charges between the collector 516 and the polarized electrode layer 518. For example, carbon black or the like can be used.

Examples of the carbon black include acetylene black, Ketjenblack, furnace black, etc. In the invention, acetylene black is preferably used. The average particle size of the carbon black is preferably 25-50 nm, and the BET specific surface area thereof is preferably not lower than 50 $m^2$/g or more preferably 50-140 $m^2$/g.

The liquid S1 is not limited especially, except that the liquid must be able to dissolve or disperse the binder P2. For example, a ketone-based solvent such as methyl ethyl ketone (MEK) or methyl isobutyl ketone (MBK) can be used. The content of the liquid S1 in the coating solution L1 is preferably made 200-400 parts by mass with respect to 100 parts by mass of the total solid content of the coating solution L1.

The content of the porous particles P1 in the coating solution L1 is preferably set so that the content of the conductive particles P1 after the polarized electrode layer 518 is formed is 84%-92% by mass with respect to the total mass of the polarized electrode layer 518. On the other hand, the content of the binder P2 is preferably set so that the content of the binder P2 after the polarized electrode layer 518 is formed is 6.5%-16% by mass with respect to the total mass of the polarized electrode layer 518. Particularly it is preferable that the contents of the porous particles P1, the binder P2 and the conductive auxiliaries P3 after the polarized electrode layer 518 is formed are set to be 84%-92%, 6.5%-16% and 0%-1.5% by mass with respect to the total mass of the polarized electrode layer 518.

It is preferable that the preparation of the coating solution L1 includes a kneading operation and/or a dilution mixing operation. Here, the "kneading" means kneading materials by stirring a liquid with comparatively high viscosity. The "dilution mixing" means adding a solvent or the like to the kneaded liquid and mixing the liquid with comparatively low viscosity. The periods and temperatures of these operations are not limited especially. In order to make the dispersion uniform, it is preferable that the kneading time is made about 30 minutes to 2 hours and the kneading temperature is made about 40° C. to 80° C., while it is preferable that the dilution mixing time is made about 1 to 5 hours and the dilution mixing temperature is made about 20° C. to 50° C.

The drier portion 620 is a portion for eliminating the liquid S1 included in the coating film L2. In the electric chemical capacitor electrode manufacturing apparatus 600 according to this embodiment, the drier portion 620 is constituted by two driers 621 and 622 disposed to put the collector 516 therebetween. The liquid S1 included in the coating film L2 is eliminated by heating with these driers 621 and 622. Thus, the coating film L2 is formed into the polarized electrode layer 518. As a result, the collector 516 has the polarized electrode layer 518 formed on its surface. In this state, however, the polarized electrode layer 518 is so low in density that high capacitance per volume cannot be obtained by the polarized electrode layer 518 as it is.

The roll press portion 630 is a portion for compressing the polarized electrode layer 518 so as to enhance its capacitance per volume. In the electric chemical capacitor electrode manufacturing apparatus 600 according to this embodiment, the roll press portion 630 has a first roller 631 disposed on the polarized electrode layer 518 side and a second roller 632 disposed on the collector 516 side. The roll press portion 630 roll-presses the laminate 520 between these rollers 631 and 632 so as to compress the polarized electrode layer 518 included in the laminate 520. Though not limited especially, a concave-convex pattern may be provided in the surface of the first roller 631 disposed on the polarized electrode layer 518 side. Thus, the concave-convex pattern is transferred to the surface of the polarized electrode layer 518 passing through the roller press portion 630 so that the polarized electrode layer 518 can be compressed effectively.

The laminate 520 which has been roll-pressed thus is wound around the take-up roll 602.

Figure 12:
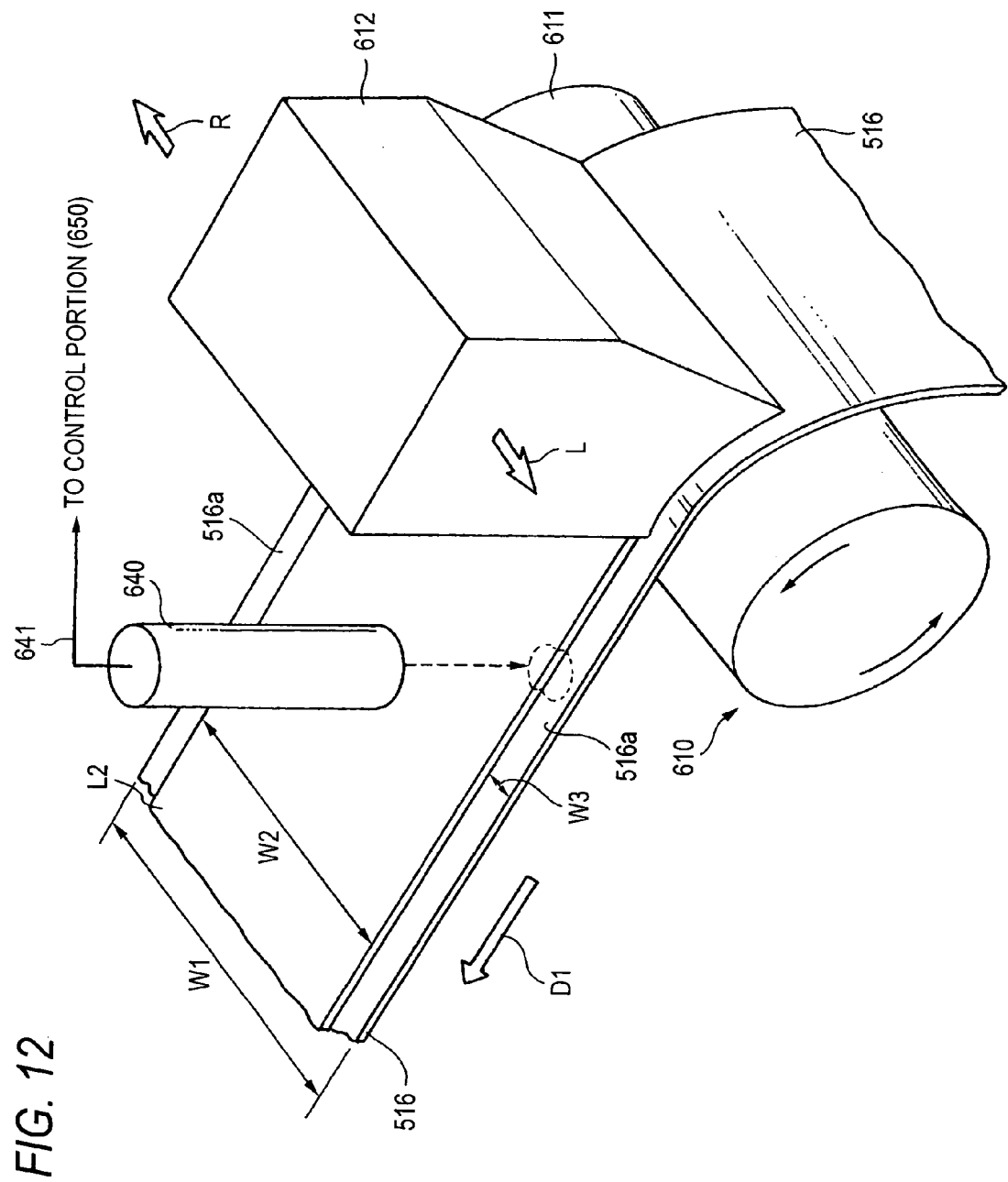
FIG. 12 is a schematic perspective view showing an enlarged vicinity of a coater portion 610.

FIG. 12 is a schematically perspective view showing an enlarged vicinity of a coater portion 610.

As shown in FIG. 12, the knife coater 612 included in the coater portion 610 forms a coating film L2 with a predetermined width as an origin of the polarized electrode layer 518 on the belt-like collector 516 conveyed in the length direction D1 so as to leave uncoated regions 516a in the width-direction opposite end portions of the collector 516. That is, when W1 designates the width of the collector 516 and W2 designates the width of the coating film L2, the relation W1>W2 is established therebetween. Thus, on the collector 516 which has passed through the coater portion 610, the coating film L2 is formed in the substantially central portion while leaving the uncoated regions 516a.

In this event, the optical sensor 640 disposed on the downstream side of the coater portion 610 detects the border position between the coating film L2 and one of the uncoated regions 516a. An output signal 641 indicating the detection result of the optical sensor 640 is supplied to the control portion 650 as described previously. Such a border detection operation of the optical sensor 640 may be referred to as "detection process".

The control portion 650 receiving the output signal 641 from the optical sensor 640 generates an output signal 651 based on the output signal 641. The drive portion 660 is controlled by the output signal 651. Thus, feedback control is performed so that the aforementioned border position coincides with a predetermined position. That is, when the border position is shifted from the predetermined position in a direction R shown in FIG. 12, the position of the knife coater 612 is displaced in a direction L directly opposite to the direction R by the drive portion 660. On the contrary, when the border position is shifted from the predetermined position in the direction L shown in FIG. 12, the position of the knife coater 612 is displaced in the direction R by the drive portion 660. Thus, the border position is substantially fixed to the predetermined position.

Such feedback control is most preferably performed in real time, but may be performed periodically. When the feedback control is performed periodically, it is preferable that the control period is determined in consideration of the conveyance speed of the collector 516 or the like. For example, setting may be done so that the feedback control is performed whenever the collector 516 is conveyed by about 1 m in the length direction.

Thus, the position where the coating film L2 as an origin of the polarized electrode layer 518 is formed is controlled with high precision. Accordingly, the width of each uncoated region 516a is substantially fixed to the desired value. Here, the width W1 of the collector 516 and the width W2 of the coating film L2 have predetermined values. Therefore, feedback control may be performed to establish the relation W3=(W1−W2)/2 when W3 designates the width of each uncoated region 516a. Thus, the widths of the two uncoated regions 516a can be made substantially equal to each other.

Figure 13:
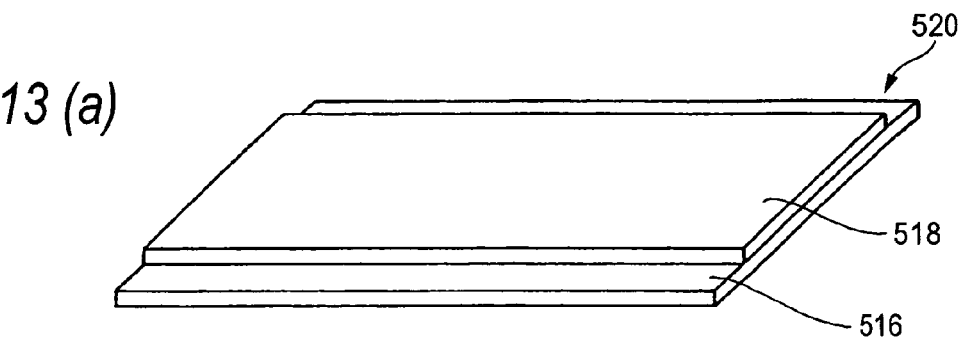
FIGS. 13A-13C are views for explaining a method for cutting an electric chemical capacitor electrode 510 out of a laminate 520.
Figure 13:
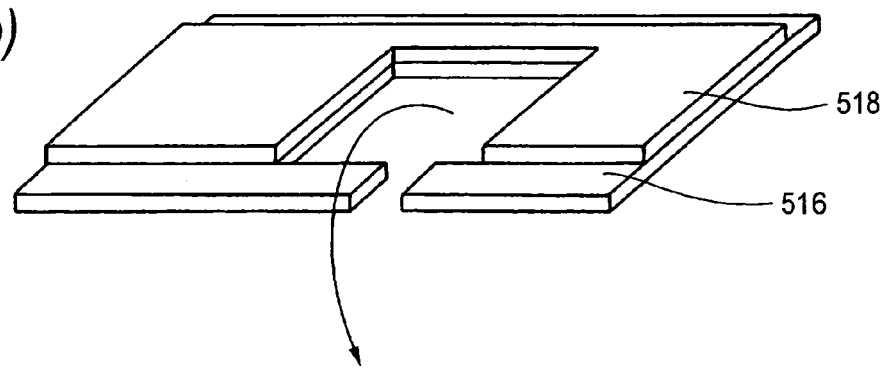
Figure 13:
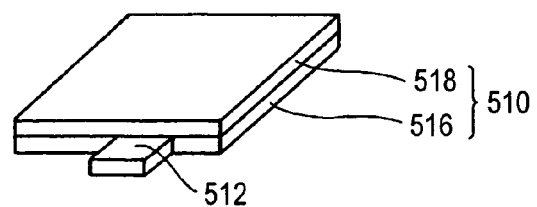

Then, the laminate 520 wound around the take-up roll 502 is cut off into a predetermined size as shown in FIG. 13A, and punched in accordance with the scale of an electric chemical capacitor to be manufactured as shown in FIG. 13B. Thus, the electric chemical capacitor electrode 510 is completed as shown in FIG. 13C. Simultaneously in this event, as shown in FIG. 13C, a part of the collector 516 uncovered with the polarized electrode layer 518 is extracted so that it can be used as the extractor electrode 512.

Here, according to this embodiment, the position where the polarized electrode layer 518 is formed is controlled with high precision by feedback control so that the width W3 of each uncoated region 516a is substantially fixed. Accordingly, the length of the extractor electrode 512 corresponding to the width W3 can be also made to have a desired value.

Figure 14:
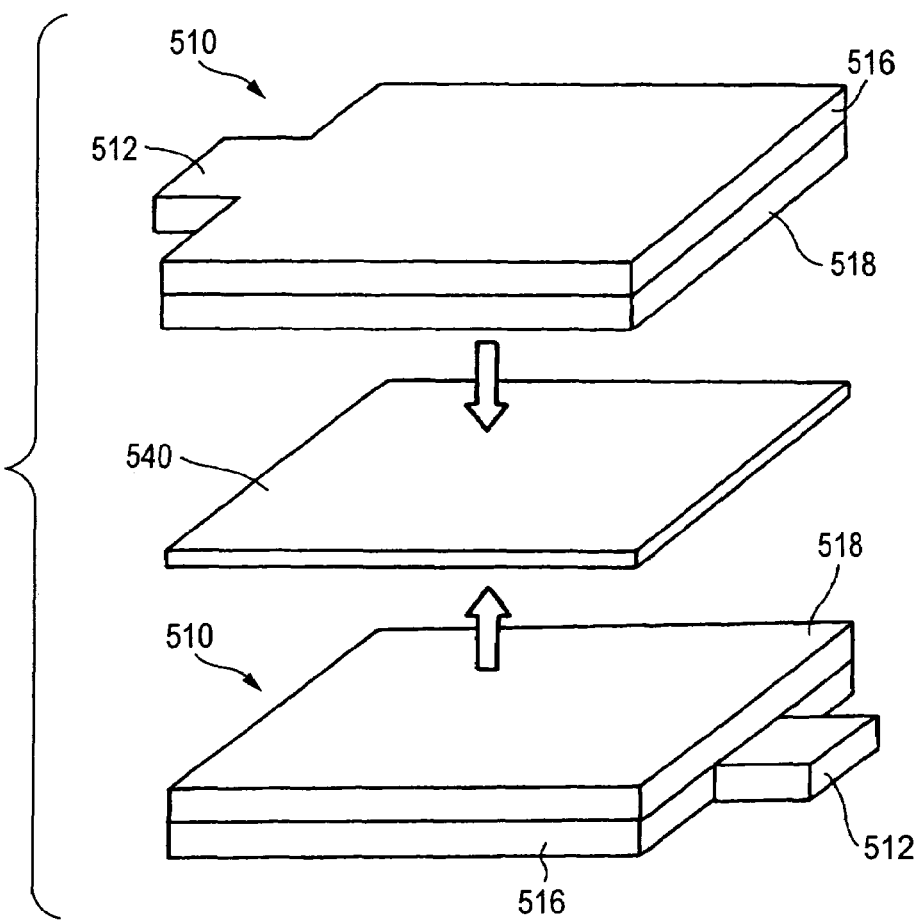
FIG. 14 is a schematic view for explaining a method for producing an electric chemical capacitor using electric chemical capacitor electrodes 510.

Then, as shown in FIG. 14, at least two electric chemical capacitor electrodes 510 manufactured thus are prepared. The separator 540 is put between the two electric chemical capacitor electrodes 510 so that the polarized electrode layers 518 face each other. After that, the electric chemical capacitor electrodes 510 with the separator 540 are received in a not-shown casing, and the casing is filled with an electrolyte solution. Thus, an electric chemical capacitor is completed.

The separator 540 is preferably formed out of an insulative porous material. For example, it is possible to use a laminate of films made of polyethylene, polypropylene or polyolefin, an oriented film of a mixture of those resins, a fibrous non-woven fabric made of at least one kind of constituent material selected from a group consisting of cellulose, polyester and polypropylene, or the like.

As the electrolyte solution, an electrolyte solution (aqueous electrolyte solution or electrolyte solution using an organic solvent) to be used in a known electric chemical capacitor such as an electric double layer capacitor can be used. However, when the electric chemical capacitor is an electric double layer capacitor, any aqueous electrolyte solution is so low in electrochemical decomposition voltage that the withstand voltage of the capacitor is limited to a low value. It is therefore preferable to use an electrolyte solution using an organic solvent (nonaqueous electrolyte solution). The specific kind of electrolyte solution is not limited especially. It is, however, preferable to select the electrolyte solution in consideration of the solubility of a solute, the degree of dissociation of the solute, and the viscosity of the solution, and particularly it is preferable that the electrolyte solution is an electrolyte solution high in conductivity and high in potential window (high in decomposition start voltage). A typical example of the electrolyte solution includes a solution having a quaternary ammonium salt such as tetraethylammonium tetrafluoroborate dissolved in an organic solvent such as propylene carbonate, diethylene carbonate, acetonitrile, etc. In this case, entrained moisture has to be managed severely.

As described above, in the electric chemical capacitor electrode manufacturing apparatus 600 according to this embodiment, the border position between the coating film L2 as an origin of the polarized electrode layer 518 and one of the uncoated regions 516a is detected by the optical sensor 640, and the width-direction position of the knife coater 612 is feedback-controlled on the basis of the detected border position. Thus, the position where the polarized electrode layer 518 is formed can be controlled with high precision. As a result, even when a part of the collector 516 is used as the extractor electrode 512, capacitance can be secured to be as high as possible without losing the easiness to assemble.

The position where the polarized electrode layer 518 is formed can be also controlled by moving the position of the supply roll 601 in the width direction based on feedback control and changing the position of the collector 516 itself It is, however, extremely difficult to shorten the distance between the supply roll 601 and the coater portion 610. Therefore, when the position of the collector 516 itself is changed, the response to the output signal 641 from the optical sensor 640 deteriorates conspicuously. In contrast, according to the invention, not the collector 516 but the knife coater 612 for forming the polarized electrode layer 518 is moved in the width direction. Thus, the response to the output signal 641 from the optical sensor 640 is so improved that the position where the polarized electrode layer 518 is formed can be controlled with high precision even when the collector 516 is conveyed at a high speed.

Figure 15:
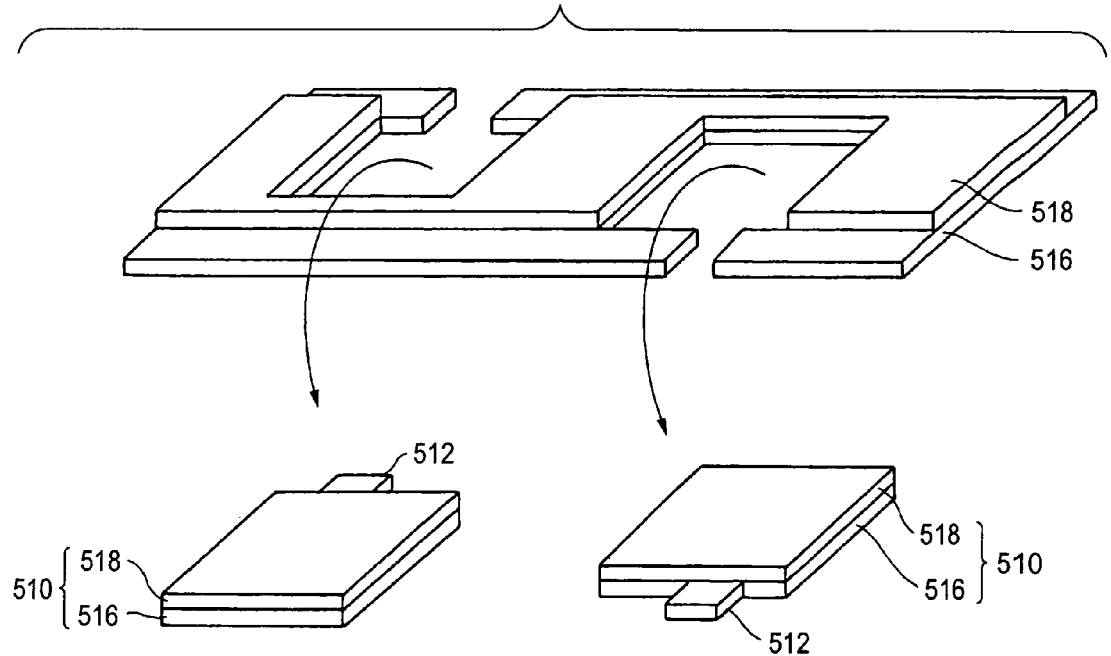
FIG. 15 is a view for explaining a method for cutting out the electric chemical capacitor electrodes 510 by punching the laminate 520 so that two uncoated areas 516a can be used as extractor electrodes 512.

When the widths of the two uncoated regions 516a are made substantially equal to each other by the feedback control, the widths of the extractor electrodes 512 extracted from the electric chemical capacitor electrodes 510 respectively can be substantially fixed even when the laminate 520 is punched so that the two uncoated regions 516a can be used as the extractor electrodes 512 as shown in FIG. 15.

The effect of the invention becomes conspicuous particularly when an undercoat layer serving as an adhesive layer is provided between the collector 516 and the polarized electrode layer 518. It is preferable that a material with conductivity high enough to prevent the resistance value from increasing is used as the material of the undercoat layer. For example, such a material can be composed of conductive particles and a binder which can bind the conductive particles. As the conductive particles, particles made of carbon materials or the like having electronic conductivity can be used. Specific examples of the carbon materials include carbon black, graphite, etc.

Examples of the carbon black include acetylene black, Ketjenblack, furnace black, etc. Of them, acetylene black is preferably used. The average particle size of the carbon black is preferably 25-50 nm, and the BET specific surface area thereof is preferably not lower than 50 $m^2/g$ or more preferably 50-140 $m^2/g$.

Examples of the graphite include natural graphite, artificial graphite, expanded graphite, etc. Particularly artificial graphite is preferably used. The average particle size of the graphite is preferably 4-6 μm, and the BET specific surface area thereof is preferably not lower than 10 $m^2/g$ or more preferably 15-30 $m^2/g$. By use of such graphite, it is possible to give superior electronic conductivity to the undercoat layer. Thus, there is a tendency to reduce the internal resistance satisfactorily.

On the other hand, the binder is not limited especially, except that it must be a material which can bind the conductive particles in the same manner as the binder contained in the polarized electrode layer 518. For example, polytetrafluoroethylene (PTFE), polyvinylidene fluoride (PVDF), polyethylene (PE), polypropylene (PP), fluororubber, etc. can be used. Of these binders, fluororubber is especially preferred. This is because the porous particles can be bound satisfactorily by use of a small content of fluororubber, while the physical and electric adhesion between the collector 516 and the polarized electrode layer 518 can be enhanced. The aforementioned materials as preferable binders to be contained in the polarized electrode layer 518 can be used as the fluororubber.

Figure 16:
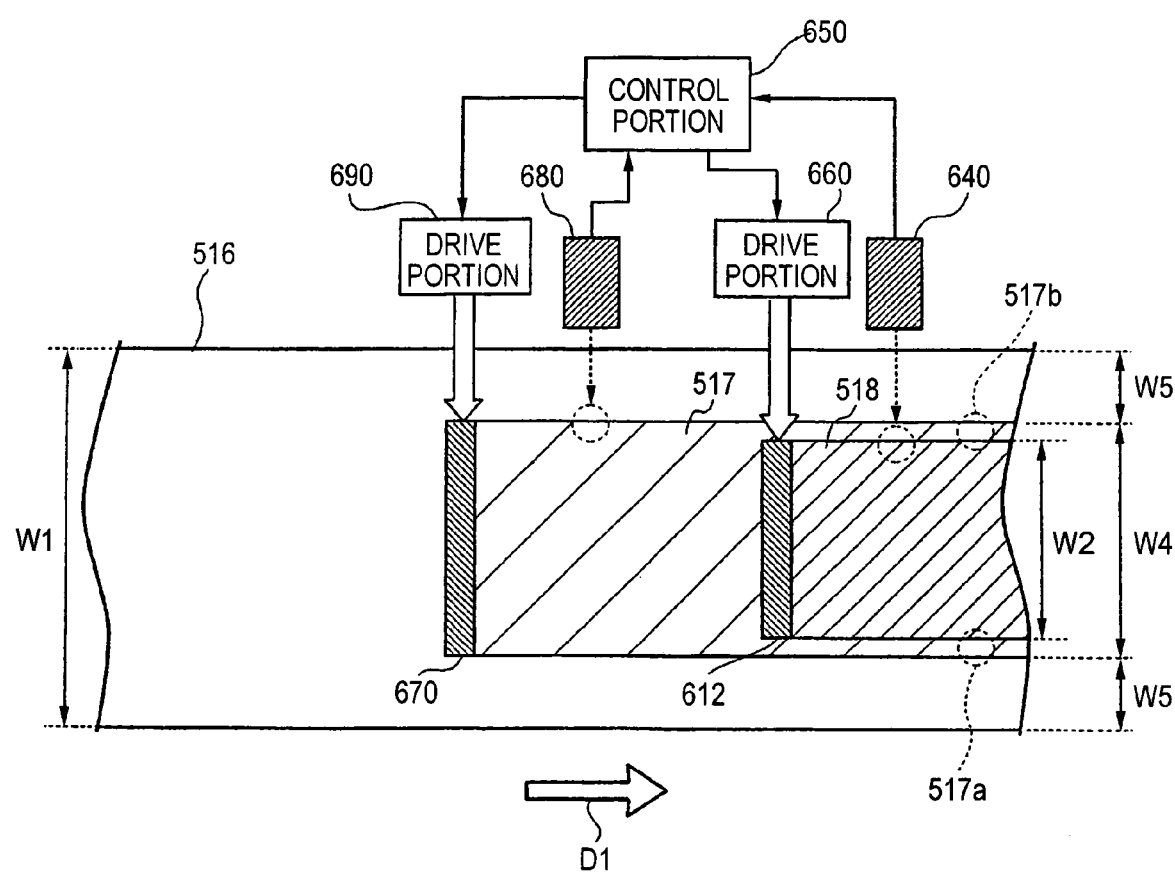
FIG. 16 is a schematic view for explaining a method for forming an undercoat layer 517 and a polarized electrode layer 518 on the surface of a collector 516.

When the undercoat layer is provided, as shown in FIG. 16 which is a schematic diagram, a coating solution for the undercoat layer is applied by a knife coater (undercoat layer coating unit) 670 located upstream while the belt-like collector 516 is conveyed in the length direction D1. Thus, the undercoat layer 517 is formed. Subsequently, a coating solution for the polarized electrode layer 518 is applied by a knife coater (electrode layer coating unit) 612 located downstream. Thus, the polarized electrode layer 518 is formed on the undercoat layer 517. Incidentally, drier portions for drying the coating films respectively are not shown in FIG. 16. The coating solution for the undercoat layer can be prepared by stirring conductive particles and a binder as materials of the undercoat layer in the aforementioned liquid S1. It is preferable that the preparation of the coating solution for the undercoat layer also includes a kneading operation and/or a dilution mixing operation.

In the apparatus configured thus, a border between a coated region and an uncoated region as to the undercoat layer 517 is detected by an optical sensor (detection unit) 680. By feedback control based on the detected border, the width-direction position of the coater portion 670 is controlled by a drive portion (drive unit) 690. In addition, a border between a coated region and an uncoated region as to the polarized electrode layer 518 is detected by an optical sensor 640. By feedback control based on the detected border, the width-direction position of the coater portion 610 is controlled by a drive portion 660. Thus, the position where the undercoat layer 517 is applied and the position where the polarized layer 518 is applied can be controlled with high precision.

Here, it is necessary to establish the relation $W4 \geq W2$ between the coating width W4 of the coater portion 670 for forming the undercoat layer 517 and the coating width W2 of the coater portion 610 for forming the polarized electrode layer 518. In addition, in consideration of the accuracy of alignment in coating position, it is preferable to establish the relation $W4 > W2$. When $W4 < W2$, the polarized electrode layer 518 will always protrude from the undercoat layer 517 in one end 517a or the other end 517b of the laminate. When $W4 = W2$, the polarized electrode layer 518 will protrude in either end portion 517a or 517b unless the position where the undercoat layer 517 is formed is perfectly aligned with the position where the polarized electrode layer 518 is formed.

It is, however, preferable that the relation $W4-W2 \leq 1.0$ mm is established in the difference between the coating width W4 of the coater portion 670 and the coating width W2 of the coater portion 610. It is more preferable that the relation $W4-W2 \leq 0.5$ mm is established. When the relation $W4-W2 \leq 1.0$ mm is established, the exposed width of the undercoat layer 517 can be made not longer than 0.5 mm in at least one of the end portions 517a and 517b. Particularly when the relation $W4-W2 \leq 0.5$ mm is established, the exposed width of the undercoat layer 517 can be made not longer than 0.5 mm in both the end portions 517a and 517b.

The reason why it is preferable that the exposed width of the undercoat layer 517 is made not longer than 0.5 mm will be described. That is, when the exposed width exceeds 0.5 mm, the area of the polarized electrode layer 518 is made smaller than necessary. As a result, the capacitance is reduced. In contrast, based on feedback control according to the invention, it is sufficient and possible to set the exposed width to be not longer than 0.5 mm. Thus, high-capacitance can be secured.

When the undercoat layer 517 is formed, it is preferable that the relation $W5=(W1-W4)/2$ is established among the width W5 of each undercoat layer uncoated region, the width W1 of the collector 516 and the coating width W4 of the undercoat layer 517 in the same manner as in the aforementioned feedback control when the coating film L2 is formed. Thus, the widths W5 of the undercoat layer uncoated regions on the width-direction opposite ends can be made substantially equal to each other.

Figure 17:
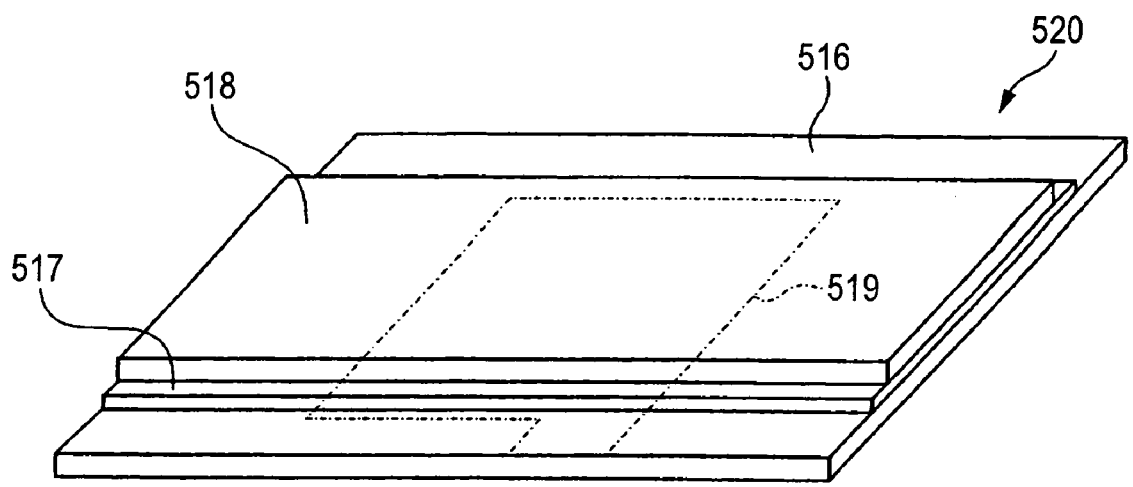
FIG. 17 is a view for explaining a method for extracting an electrode from the laminate 520 including the undercoat layer 517.
Figure 18:
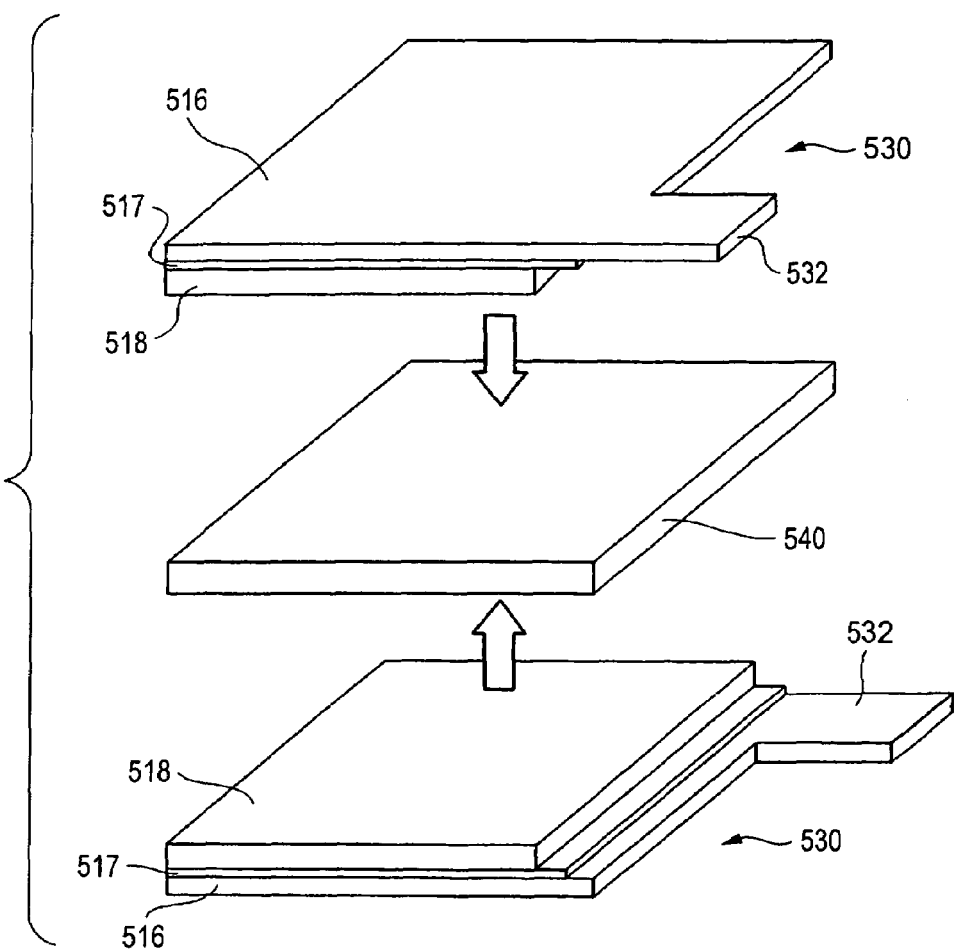
FIG. 18 is a schematic view for explaining a method for manufacturing an electric chemical capacitor using electric chemical capacitor electrodes 530.

The undercoat layer 517 and the polarized electrode layer 518 are formed thus to be laminated on the surface of the belt-like collector 516, and then cut off along the chain line 519 shown in FIG. 17. Thus, an electric chemical capacitor electrode is completed. Then, as shown in FIG. 18, two electric chemical capacitor electrodes 530 completed thus are prepared, and a separator 540 is put therebetween. After that, the two electric chemical capacitor electrodes 530 with the separator 540 are received in a not-shown casing, and the casing is filled with an electrolyte solution. Thus, an electric chemical capacitor having its terminals in the extractor electrodes 532 is completed.

Figure 19:
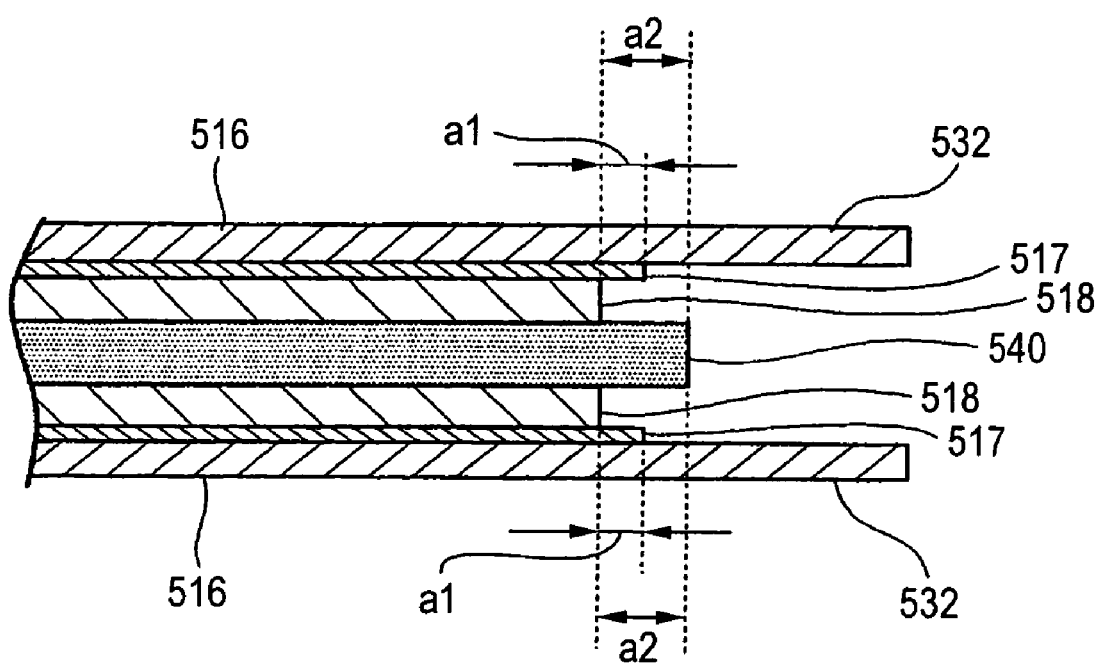
FIG. 19 is a partial sectional view showing a state where the electric chemical capacitor electrodes 530 are laminated through a separator 540.

FIG. 19 is a partial sectional view showing the state where the electric chemical capacitor electrodes 530 are laminated through the separator 540.

Assume that "a1" designates the distance between an end portion of the polarized electrode layer 518 and an end portion of each undercoat layer 517, and "a2" designates the distance between the end portion of the polarized electrode layer 518 and an end portion of the separator 540, as shown in FIG. 19. In this case, as described in the first embodiment, the value of the distance a1 can be set so small (preferably not larger than 0.5 mm) that the relation $0 \leq a1 < a2$ can be established easily.

Here, the distance a1 has a positive value in the case (state shown in FIG. 19) where the end portion of the undercoat layer 517 is located on the outer side of the end portion of the polarized electrode layer 518, and the distance a2 has a positive value in the case (state shown in FIG. 19) where the end portion of the separator 540 is located on the outer side of the end portion of the polarized electrode layer 518.

Accordingly, the end portion of each undercoat layer 517 is located in the same position as or on the outer side of the end portion of the corresponding polarized electrode layer 518, and located on the inner side of the end portion of the separator 540. As a result, the undercoat layer 517 is always present under each polarized electrode layer 518. Thus, there is no fear that peeling occurs in the polarized electrode layer 518. In addition, the separator 540 is always put between the upper and lower undercoat layers 517. Thus, there is no fear that the undercoat layers abut against each other or the undercoat layer 517 of one electrode abuts against the collector 516 of the other electrode.

When the undercoat layer 517 is provided between the collector 516 and the polarized electrode layer 518, the coating positions of the undercoat layer 517 and the polarized electrode layer 518 are controlled while performing feedback control. Thus, in addition to the effect according to the aforementioned embodiment, a failure of short-circuit can be effectively prevented from occurring due to the undercoat layer 517.

Figure 20:
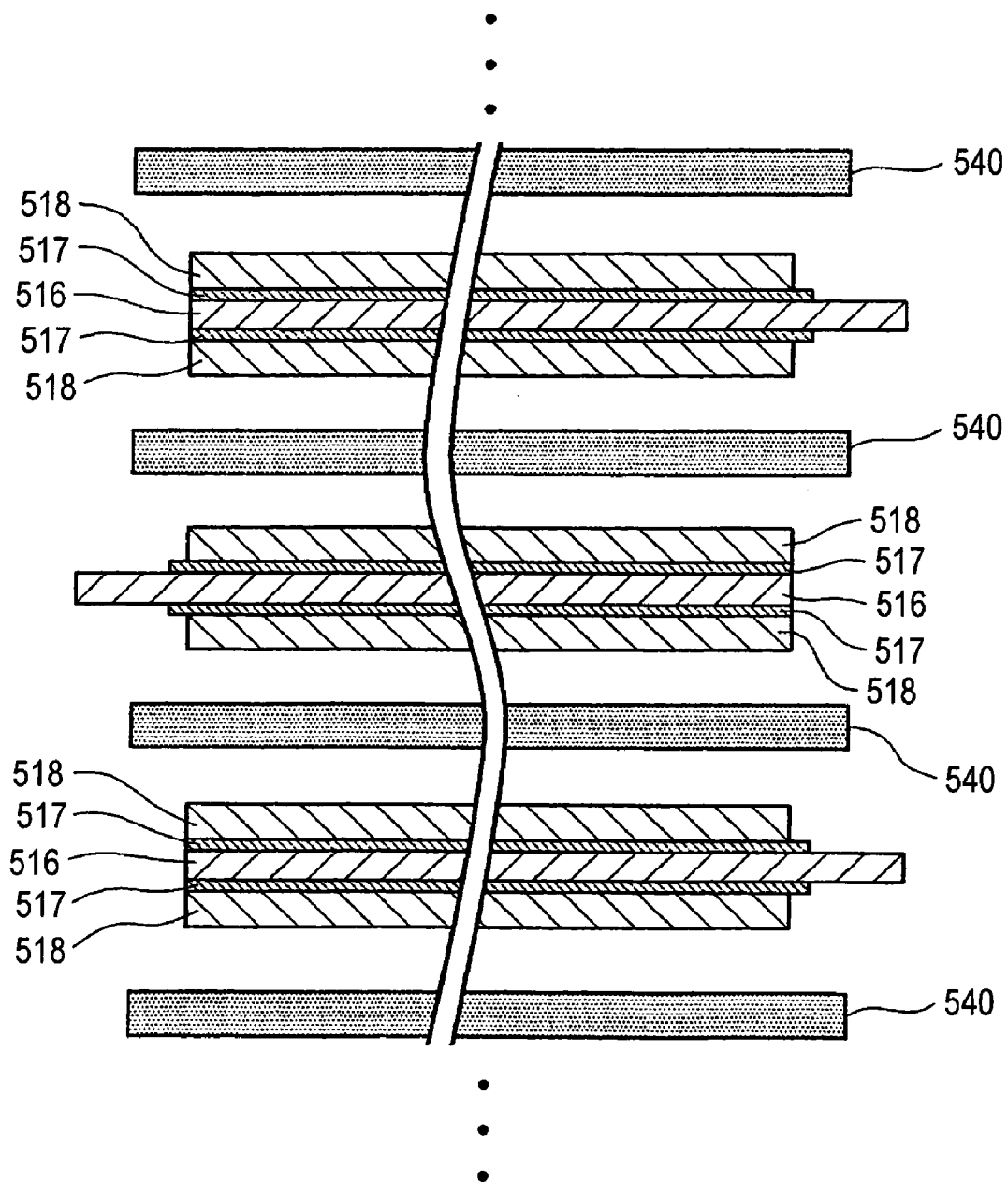
FIG. 20 is a schematic exploded sectional view of an electric chemical capacitor having a plurality of electrodes in each of which an undercoat layer 517 and a polarized electrode layer 518 are formed on the opposite sides of a collector 516.

Further, when the electric chemical capacitor electrode manufacturing apparatus according to the invention is used, the upper and lower undercoat layers 517 and the upper and lower polarized electrode layers 518 can be aligned correctly even for manufacturing an electrode in which the undercoat layers 517 and the polarized electrode layers 518 are formed on the opposite sides of the collector 516 as in an electric chemical capacitor shown in FIG. 20. As a result, a failure of short-circuit can be effectively prevented from occurring, while sufficient capacitance is secured.

Although detailed description has been made above about the preferred embodiments of the invention, the invention is not limited to the embodiments.

For example, a knife coating method is used for forming a coating film as an origin of a polarized electrode layer in the aforementioned embodiments. However, other methods such as an extrusion lamination method, a doctor blade method, a gravure coating method, a reverse coating method, an applicator coating method, a screen printing method, a die coating method, etc. can be used if the width-direction position can be controlled.

In the aforementioned embodiment, the coating film L2 as an origin of the polarized electrode layer 518 is formed with a predetermined width so that the uncoated regions 516a are left in the width-direction opposite end portions of the collector 516 as shown in FIG. 12. However, it is not essential to form the uncoated regions 516a in both the opposite end portions of the collector 516, but it is sufficient to form the uncoated region 516a in at least one of the end portions. When the uncoated region 516a is formed in only one end portion, the optical sensor 640 may detect the border position in that end portion.

Further, the electric chemical capacitor electrode manufacturing apparatus according to the invention does not have to be designed so that the coater portion 610, the drier portion 620 and the roll press portion 630 are disposed continuously and integrally as in the apparatus shown in FIG. 10. The apparatus may be an aggregate of two or more pieces of apparatus if the aforementioned layout order is secured. For example, the sheet-like collector 516 passing through the drier portion 620 may be once taken up and then roll-pressed by another apparatus having a roll press portion.

In addition, the undercoat layer 517 may be first formed using the apparatus shown in FIG. 10, and once taken up like a roll, before the coating film L2 is formed on the undercoat layer 517 using the same apparatus. Also in this case, the coating widths W2 and W4 and the uncoated region widths W3 and W5 may be controlled as in the aforementioned embodiment. Further, roll press after coating may be performed by another apparatus as described above.

Incidentally, not only is it possible to use electric chemical capacitor electrodes according to the invention as electric double layer capacitor electrodes, but it is also possible to use them as electrodes for various electric chemical capacitors such as pseudo-capacitors, redox capacitors, etc.

INDUSTRIAL APPLICABILITY

According to the invention, it is possible to provide an electric chemical capacitor in which short-circuit through an undercoat layer is prevented. Further, it is possible to provide a method and apparatus for manufacturing an electric chemical capacitor electrode, in which the position where an polarized electrode layer is formed can be controlled with high precision.

What is claimed is:

1. A method of manufacturing an electrode for an electric chemical capacitor, comprising the steps of:
    coating a belt-like collector conveyed in a length direction thereof with a polarized electrode layer having a predetermined width so as to leave an uncoated region in at least one of width-direction opposite end portions of said collector (coating step); and
    detecting a border position between a region coated with said polarized electrode layer and said uncoated region on said collector (detection step);
    wherein feedback control is performed on said coating step based on a detection result in said detection step so as to fit said border position to a predetermined position.

2. A method for manufacturing an electrode for an electric chemical capacitor according to claim 1, wherein in said coating step, said collector is coated with said polarized electrode layer so that uncoated regions are left in said width-direction opposite end portions of said collector, and widths of said uncoated regions are made substantially equal to each other by said feedback control.

3. Apparatus for manufacturing an electrode for an electric chemical capacitor, comprising:
    a conveyance unit for conveying a belt-like collector in a length direction thereof
    an electrode coating unit for coating said collector with a polarized electrode layer having a predetermined width so as to leave an uncoated region in at least one of width-direction opposite end portions of said collector;
    a detection unit for detecting a border position between a region coated with said polarized electrode layer and said uncoated region on said collector;
    a drive unit for driving said electrode coating unit in said width direction of said collector; and
    a control unit for performing feedback control on said drive unit based on a detection result of said border position obtained by said detection unit.

4. Apparatus for manufacturing an electrode for an electric chemical capacitor according to claim 3, wherein said electrode coating unit coats said collector with said polarized electrode layer so that uncoated regions are left in said width-direction opposite end portions of said collector.

5. Apparatus for manufacturing an electrode for an electric chemical capacitor according to claim 3, further comprising:
    an undercoat coating unit provided on the upstream side of said electrode coating unit and for coating said collector with an undercoat layer having a predetermined width so as to leave an uncoated region in at least one of said width-direction opposite end portions of said collector.

6. Apparatus for manufacturing an electrode for an electric chemical capacitor according to claim 5, further comprising:
    another detection unit for detecting a border position between a region coated with said undercoat layer and said uncoated region uncoated with said undercoat layer on said collector; and
    another drive unit for driving said undercoat coating unit in said width direction of said collector;
    wherein said control unit performs feedback control on said another drive unit based on a detection result of said border position obtained by said another detection unit.

7. Apparatus for manufacturing an electrode for an electric chemical capacitor according to claim 5, wherein said electrode coating unit applies said polarized electrode layer not onto said uncoated region uncoated with said undercoat layer but onto said region coated with said undercoat layer.

* * * * *